United States Patent [19]

Beato

[11] Patent Number: 4,977,602

[45] Date of Patent: Dec. 11, 1990

[54] CHARACTER NORMALIZATION USING AN ELLIPTICAL SAMPLING WINDOW FOR OPTICAL CHARACTER RECOGNITION

[75] Inventor: Louis J. Beato, Rochester, N.Y.

[73] Assignee: Eastman Kodak Company, Rochester, N.Y.

[21] Appl. No.: 439,222

[22] Filed: Nov. 20, 1989

[51] Int. Cl.$^5$ .............................................. G06K 9/56
[52] U.S. Cl. ........................................ 382/27; 382/47; 382/54; 358/433; 340/731
[58] Field of Search ............................ 382/47, 27, 54; 358/433, 451; 340/731, 733

[56] References Cited

U.S. PATENT DOCUMENTS

| | | | |
|---|---|---|---|
| 3,784,981 | 1/1974 | Boroski, Jr. ........................ | 340/146 |
| 3,976,982 | 8/1976 | Eiselen ............................... | 340/172 |
| 4,290,084 | 9/1981 | Minshull et al. ................... | 358/260 |
| 4,381,547 | 4/1983 | Ejiri .................................... | 382/47 |
| 4,437,122 | 3/1984 | Walsh et al. ........................ | 382/54 |
| 4,484,347 | 11/1984 | Kashioka ............................ | 382/47 |
| 4,528,693 | 7/1985 | Pearson et al. .................... | 382/47 |
| 4,569,081 | 2/1986 | Mintzer et al. .................... | 382/47 |
| 4,680,720 | 7/1987 | Yoshii et al. ....................... | 364/521 |
| 4,712,140 | 12/1987 | Mintzer et al. .................... | 358/260 |
| 4,725,892 | 2/1988 | Suzuki et al. ....................... | 358/287 |
| 4,747,154 | 5/1988 | Suzuki et al. ....................... | 382/47 |
| 4,771,471 | 9/1988 | Kitamura ............................ | 382/41 |

Primary Examiner—Leo H. Boudreau
Assistant Examiner—Steven P. Fallon
Attorney, Agent, or Firm—Dennis R. Arndt

[57] ABSTRACT

In character normalization for optical character recognition preprocessing employing horizontal and vertical scaling factors A and B, the value of each pixel in the normalized character image superimposed on the original character image is determined from the values of the pixels in the original image lying within an elliptical neighborhood surrounding the normalized character image pixel and having major and minor elliptical axes proportional to A and B.

16 Claims, 4 Drawing Sheets

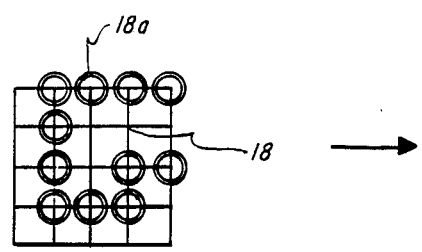
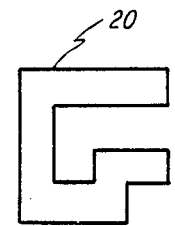
FIG. 2A                FIG. 2B
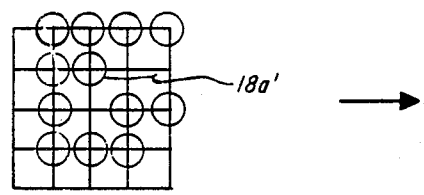
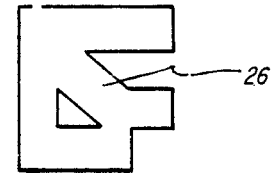
FIG. 3A                FIG. 3B
              (RECTAGULAR SAMPLING)

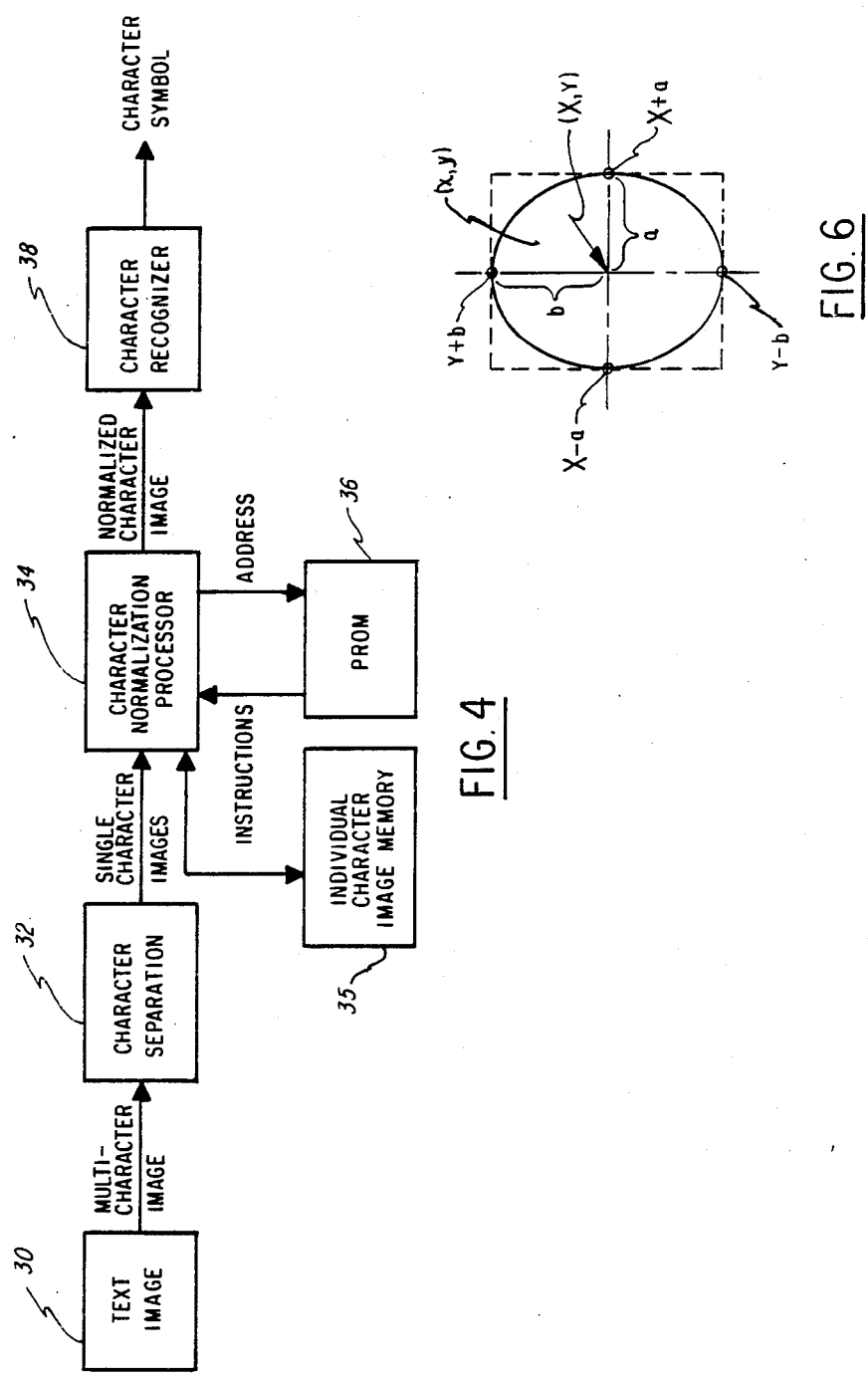

CHARACTER NORMALIZATION USING AN ELLIPTICAL SAMPLING WINDOW FOR OPTICAL CHARACTER RECOGNITION

BACKGROUND OF THE INVENTION

1. Technical Field

The invention is related to optical character recognition and in particular to the normalization of characters of different sizes to a uniform size in optical character recognition.

2. Problem to be Solved by the Invention

Optical character recognition systems which recognize printed characters generally require that the sizes of all of the characters to be recognized be the same uniform size. Quite often, however, a text which is to be processed by an optical character recognition system contains printed characters of various point sizes. In order for the system to process such a text, character normalization must be performed on each character whose size is different from the desired size in order to change each such character to the desired size. Each character image is first separated from the other images in the text prior to character recognition. Then, the normalization process changes (if necessary) the character size to the correct size. In many cases, it is necessary to scale the character image to make it "fatter" or "skinnier" relative to its original aspect ratio. Thus, it is required to control both the size and the proportion (aspect ratio) of each character prior to character recognition processing.

It is desirable to preserve the strokes in each character without loosing any due to the character normalization process. Thus, for example, if the character size is to be reduced, the number of pixels representing the reduced character will necessarily be reduced. The problem is how to reduce the image size while minimizing the amount of lost character stroke information. If the pixels in the new (reduced) image are simply taken from the pixels in corresponding locations in the original image, then the remaining pixels will be discarded and the information they represent will be irretrievably lost.

In accordance with one goal of the invention, the reduction in the number of pixels representing a character of reduced size is compensated by computing each pixel in the new (reduced) image based upon the values of a local neighborhood of pixels surrounding the corresponding location in the old image. This minimizes the information lost through a reduction in the number of pixels representing each character. This however raises the another problem, namely, how to define the neighborhood of pixels in the old image which are to be considered in computing the pixel in the new image. This problem is particularly acute where the character size as well as its shape (aspect ratio) must be changed. One solution that may be tried is to define the neighborhood as a rectangle whose proportion reflects the ratio of the horizontal and vertical scale factors by which the character size must be reduced. Such an approach has been suggested, but not particularly for normalizing individual character images, in U.S. Pat. No. 4,725,892 to Suzuki et al. In fact, if applied to optical character recognition, such an approach would create other problems. Specifically, the use of the rectangular sampling window can create false character strokes in the reduced image.

In summary, character normalization involving a size reduction and aspect ratio change has created one of two problems. If each pixel in the new (reduced) image is taken only from the pixel in the corresponding position in the old image, then the remaining pixels in the old image are discarded and their character stroke information is irretrievably lost. On the other hand, if each pixel in the new (reduced) image is taken from all of the pixels lying in a neighborhood surrounding the corresponding location in the old image, then false character strokes may be introduced into the new image.

Accordingly, it is an object of the present invention to perform character normalization without discarding a significant amount of character stroke information and without introducing false character strokes into the normalized character image.

DISCLOSURE OF THE INVENTION

The invention is comprised in an optical character recognition system in which a text image of individual characters is separated into individual character images in an optical character recognition preprocessor, and the size and shape of each character is determined relative to a predetermined character size and shape (aspect ratio). The invention includes an optical character recognition character normalization processor which changes the size and/or shape (aspect ratio) of each individual character image whenever it significantly deviates from the predetermined size and/or shape, respectively. This change is specified by independent horizontal and vertical scaling factors. The value of each pixel in the new (normalized) image is determined by considering the value of each pixel in a neighborhood surrounding the corresponding location in the original character image.

In accordance with the invention, the shape of this neighborhood is automatically constrained in proportion to the horizontal and vertical scaling factors so as to optimally capture those pixels in the original image which are most relevant in determining the value of the corresponding pixel in the new (normalized) image while excluding those which are less relevant and therefore more likely to be misleading with respect to the current pixel location.

More specifically, in accordance with the invention, the shape of the neighborhood is automatically constrained be an ellipse whose horizontal (minor) axis corresponds to the horizontal scaling factor and whose vertical (major) axis corresponds to the vertical scaling factor.

In the preferred embodiment of the invention, an array of normalized character image pixel locations are superimposed in the original character image and have a pitch (or periodic spacing between adjacent pixels) with respect to the original image pixels equal to the horizontal scaling factor in the horizontal direction and equal to the vertical scaling factor in the vertical direction. An elliptical neighborhood is defined around each of these normalized character image pixel locations having an elliptical major axis spanning a number of pixels in the original image equal to the vertical scaling factor and an elliptical minor axis spanning a number of pixels in the original image equal to the horizontal scaling factor. Then, a determination is made as to which pixels in the original image lie within or on the boundary of the elliptical neighborhood. The value of the normalized character image pixel image is computed from the values of the pixels in the old image which lie within or on the border of the elliptical neighborhood. The normalized character image pixel values thus determined now comprise the "new" normalized character image.

The elliptical neighborhood sampling process of the invention has two advantages. First, including such a neighborhood of plural pixels minimizes the loss of character stroke information typically accompanying a reduction in character size. Second, the elliptical shape defines a group of pixels whose boundary is proportionately equidistant, within the limitations posed by differing horizontal and vertical scaling factors, from the location for which a normalized character image pixel value is to be computed. For example, if the horizontal and vertical scaling factors are equal, the ellipse reduces to a circle and the neighborhood boundary truly becomes equidistant from the normalized pixel location of interest. Thus, pixels which are disproportionately far away from the pixel location of interest are excluded. This stands in stark contrast to results obtained using a rectangular neighborhood, in which neighboring pixels lying within a corner of the rectangle—and which are therefore disproportionately far away—are included in the computation of the value of the new pixels. Such pixels are misleading with respect to the computation of the value of the current pixel location. As will be seen below in the detailed description, such a technique will often create a false character stroke in the new image. The present invention minimizes such mistakes.

BRIEF DESCRIPTION OF THE DRAWINGS

The invention is best understood by reference to the accompanying drawings, of which:

FIGS. 2a and 2b illustrate the character normalization results obtained using the invention;

FIGS. 3a and 3b illustrate the character normalization results obtained using a rectangular sampling window;

FIG. 4 is a simplified block diagram illustrating an optical character recognition embodying the invention;

FIG. 6 is a graph illustrating some parameters in the flow diagram of FIG. 5.

MODES OF CARRYING OUT THE INVENTION

Figure 1:
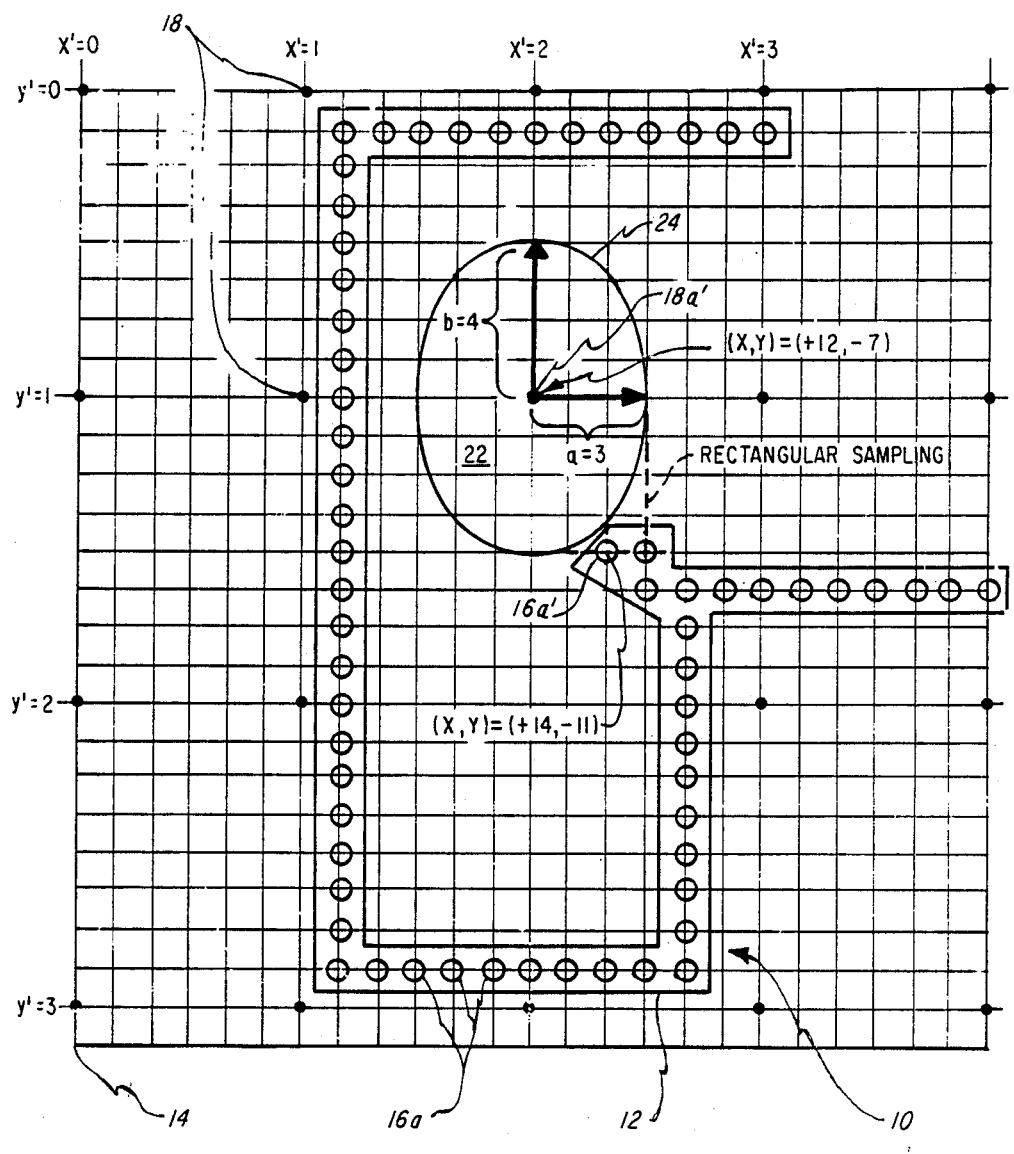
FIG. 1 is a simplified illustration of the pixels in an individual character image, showing an elliptical sampling window in accordance with the invention.

Referring to FIG. 1, an binary image 10 of an individual character 12 consists of an array 14 of individual pixels 16 (picture elements). The pixels 16 are arranged in horizontal rows parallel to an x-axis and in vertical columns parallel to a y-axis and are individually addressable by individual x-y coordinates. In such a binary image, each pixel is either "on" or "off", the "on" pixels 16a being the small circles. The individual character 12 is an outline of the pattern of the "on" pixels 16a. In the present example, the character 12 does not conform with a predetermined size and shape (aspect ratio) to which it must be reduced. The desired size and shape is depicted in the same scale as FIG. 1 in the pattern of "on" pixels 18a of FIG. 2a and the corresponding "normalized" character image 20 of FIG. 2b. The pixel densities (spacings between adjacent pixels) of FIGS. 1 and 2 are identical. The normalization process which transforms the character image 12 of FIG. 1 to the normalized character image of FIG. 2b requires (in this specific example) a reduction in size along the x-axis by a horizontal scaling factor of 6 and a reduction in size along the y-axis by a vertical scaling factor of 8. FIG. 1 shows the x'-y' axes of FIG. 2a stretched out to the scale of FIG. 1 and the corresponding pixels 18 of FIG. 2 superimposed in FIG. 1 as black dots. Note that the x' pixels 18 occur once for every six pixels along the x-axis of FIG. 1 and that the y' pixels occur once for every eight pixels along the y-axis of FIG. 1. Because the horizontal and vertical scaling factors in this example are integer numbers (i.e., six and eight), the "new" pixels 18 lie on top of the "old" pixels 16 in the stretched superimposed image of FIG. 1. However, it should be noted that these scaling factors may be any real numbers, including non-integers or irrational numbers, so that the "new" pixels 18 may lie anywhere in between adjacent ones of the old pixels 16, depending upon the value of the scaling factors chosen.

The problem in creating the normalized character image 20 of FIG. 2b is how to determine from the pattern of "on" pixels 16a of FIG. 1 which ones of the pixels 18 of the normalized image of FIG. 2a are to be turned "on". In accordance with the invention, this determination is made by defining an elliptical neighborhood 22 surrounding each one of the "new" pixels 18 superimposed in FIG. 1 and then determining which ones of the "old" pixels 16 lie within the elliptical neighborhood. The "new" pixel 18 is turned "on" if any one of the old pixels 16 lying within the elliptical neighborhood 22 is "on".

The elliptical neighborhood 22 is bounded by an ellipse 24 whose major axis precisely spans a number of "old" pixels 16 equal to the vertical scaling factor (in this example, eight) and whose minor axis precisely spans a number of "old" pixels 16 equal to the horizontal scaling factor (in this example, six). This ellipse may be thought of as being centered around successive ones of the "new" pixels 18 superimposed in FIG. 1 as a movable sampling window which captures those of the "old" pixels 16 which are most relevant to the determination of the value of the corresponding "new" pixel 18.

Introduction of False Character Strokes without the Invention

The advantage of defining such a sampling window is that the addition of false character strokes in the "new" or normalized character image of FIG. 2b is minimized or avoided. For example, consider the apparently spurious "on" pixel 16a' in the original image of FIG. 1 at x-y coordinates (+14, −11) and its two nearest neighbors. If a square sampling window is employed whose length in number of pixels is equal to the vertical scaling factor (or a rectangular sampling window is employed whose horizontal and vertical sides in pixel lengths are equal to the horizontal and vertical scaling factors, respectively), then the sampling window for the "new" pixel 18a' superimposed in FIG. 1 at x-y coordinate (+12, −7) will capture the "on" pixel 16a' at (+14, −11). This will cause the value of the "new" pixel 18a' to be "on", as illustrated in FIG. 3a, giving rise to a false character stroke 26 in the resulting character image illustrated in FIG. 3b.

The Invention Avoids False Character Strokes

The present invention avoids such an error, since the "spurious" pixel 16a' is outside of the elliptical neighborhood 22. At the same time, however, the elliptical neighborhood includes a significant plurality of "old" pixels 16 surrounding each "new" pixel location in the superimposed image of FIG. 1 so that a reliable decision is made regarding each "new" pixel.

An optical character recognition preprocessing system embodying the invention is illustrated in FIG. 4. A memory 30 stores an image of a text consisting of many individual character images. A character separation processor 32, which can use techniques well-known in the art, separates the text image from the memory 30 into many separate individual character images. Each of these individual character images is then processed in turn by a character normalization processor 34 employing the elliptical sampling window process described above in connection with FIG 1. The processor 34 does this by storing the original individual character image in a memory 35 and computing the pixel values of the normalized image from the image data stored in the memory 35 by executing special processing instructions stored in a read-only memory 36. As a result, each individual character image is normalized by the processor 34 to a predetermined size and proportion (aspect ratio) which is the same for all normalized characters. Each normalized character thus generated by the processor 34 is then transmitted to a character recognizer processor 38 which can use well-known techniques to correlate each normalized individual character image to one of a predetermined set of characters. The normalization process is necessary because, in general, character recognition processors such as the processor 38 require that each received individual character image be of a certain size and aspect ratio in order to function.

Figure 5:
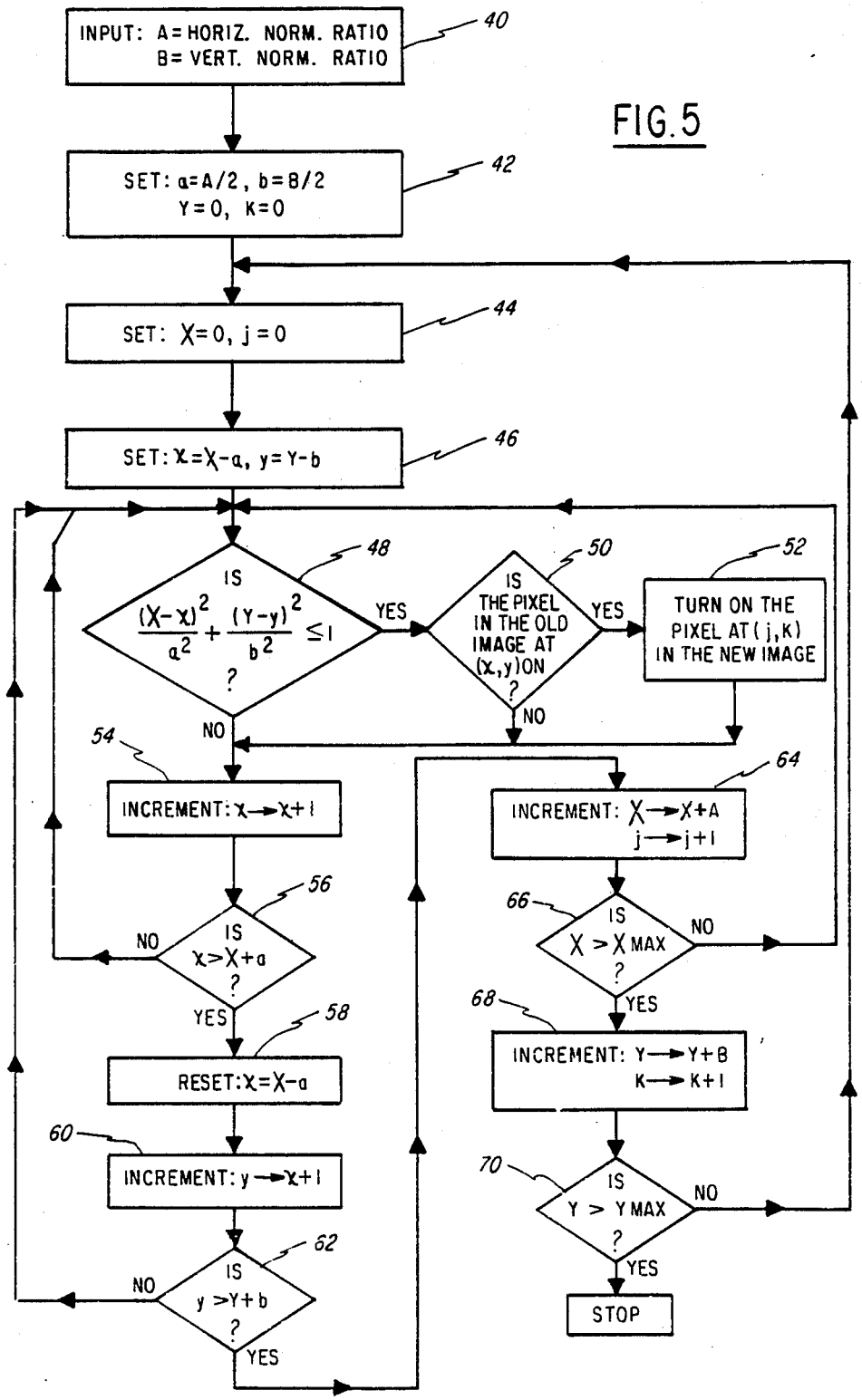
FIG. 5 is a flow diagram illustrating the process of the invention performed in the system of FIG. 4.

Operation of the normalization processor 34 is illustrated in FIG. 5. FIG. 5 is representative of the type of instructions stored in the read-only memory 36 and is an implementation of the concept described above in connection with FIG. 1. Operation begins with the character separation processor 32, using techniques well-known in the art, determining horizontal and vertical scaling factors for the current individual character image. Essentially, the character separation processor determines by how much the current individual character image deviates from the predetermined character size and aspect ratio. Of course, this function can be implemented in either the character separation processor 32 or in the normalization processor 34. The resulting horizontal and vertical scaling factors are stored as A and B, respectively, by the normalization processor 34 (block 40 of FIG. 5). A and B may be any real number, including fractions or irrational numbers, but in the example of FIG. 1, A=6 and B=8. The normalization processor 34 then initializes several parameters by setting a=A/2, b=B/2, Y=0, k=0 (block 42 of FIG. 5), and X=0, j=0 (block 44), and x=X-a, y=Y-b (block 46). X and Y are the coordinates of successive ones of the "new" pixels 18 superimposed in the x-y coordinate system of "old" pixels of FIG. 1, j and k are the coordinates of the "new" pixels 18 in the "new" coordinate system of FIG. 2, while x and y are the coordinates of successive ones of the "old" pixels 16 in the coordinate system of FIG. 1. As in FIG. 1, the origins of the old and new coordinate systems are placed at the same point by initializing both (x,y) and (X,Y) at (0,0), although another alignment may be chosen. As will be seen and as depicted in the graph of FIG. 6, for each "new" pixel location (X,Y), a determination is made in this exemplary embodiment as to which one of the "old" pixel locations (x,y) within a rectangle between X+a and X−a and between Y+b and Y−b are within an ellipse centered at (X,Y) whose major and minor axes are 2b and 2a, respectively.

The foregoing is accomplished by determining whether the quantity $(X-x)^2+(Y-y)^2$ is less than or equal to 1 (block 48). If so (YES branch of block 48), then a determination is made whether the "old" pixel 16 at the current value of (x,y) is "on" (block 50). If it is "on" (YES branch of block 50), then the "new" pixel at the location X=j and Y=k is assigned the value "on" (block 52). On the other hand, if the foregoing algebraic quantity is greater than one (NO branch of block 48) or if the "old" pixel was not "on" (NO branch of block 50), then x is incremented to the next "old" pixel location along the x axis of FIG. 1 (block 54) and it is determined whether the new value of x exceeds X+a (block 56). If not (NO branch of block 56) the process returns to the determination of block 48 and the succeeding steps previously described are repeated as x is incremented successively. Once x exceeds its maximum value (X+a) (YES branch of block 56), it is reset to its starting value (block 58), y is incremented to the next "old" pixel location along the y axis of FIG. 1 (block 60) and a determination is made whether y has exceeded its maximum value of Y+b (block 62). If not (NO branch of block 62), the process returns to the determination step of block 48 and the succeeding steps described above are repeated as x is successively incremented again.

As soon as y reaches its maximum value (YES branch of block 62), the elliptical sampling window 22 of FIG. 1 must be "stepped" to the location of the next "new" pixel 18 in the array of FIG. 1. Thus, X is incremented to X+A, the location of the next "new" pixel along the x-axis of FIG. 1, and j is incremented to j+1 (block 64). A determination is then made whether the new value of X exceeds the boundary of the array 10 of FIG. 1 (block 66). If not (NO branch of block 66), the process returns to the determination step of block 44, and the succeeding steps previously described are repeated as X is successively incremented. On the other hand, if the new value of X exceeds the array boundaries (YES branch of block 66), Y is incremented to Y+b, the location of the next "new" pixel along the y axis of FIG. 1, and k is incremented to k+1 (block 68). A determination is then made whether the new value of Y exceeds the boundaries of the arry 10 (block 70). If not (NO branch of block 70), the process returns to the initialization step of block 44 and the succeeding steps previously described are repeated as Y is successively incremented. As soon as Y reaches its maximum value, the construction of the normalized character image (FIGS. 2a and 2b) is completed.

The invention has been described in connection with an example in which the normalization required the character size to be reduced, so that A and B were integers greater than unity. However, either A or B or both A and B may be non-integers (e.g., 2.337 and 4.539) and either or both may be less than unity for character size reduction. Also, the size of the elliptical neighborhood may be adjusted so that successive sampling windows overlap or underlap to a greater extent than that of the exemplary embodiment described above. This is done by modifying the computation in block 48 of FIG. 5 to be:

$$(X-x)^2/a^2+(Y-y)^2/b^2 < R \text{ or } = R,$$

where R is any number not necessarily equal to one.

The invention has been described in connection with a binary image in which each pixel in the normalized image is either "on" or "off" depending upon whether any of the pixels in the corresponding elliptical neighborhood in the original image were "on". However, the invention is also useful in connection with normalizing a gray-scale image in which the value of each pixel in the normalized image is computed from a statistical ensemble (such as a mean value) of the pixel gray level of each of the pixels within the corresponding elliptical neighborhood in the original image.

Finally, the algorithm of FIG. 5 is just one of many approaches which may be used to implement the concept of the invention.

INDUSTRIAL ADVANTAGES AND APPLICABILITY

The invention is thus useful as a preprocessor to prepare data derived by scanning a document containing text character images for optical character recognition (OCR) processing. More specifically, the invention is useful in OCR preprocessing of documents containing text characters of different point sizes to change all of the characters to the same uniform size. This has the advantage of greatly simplifying the optical character recognition process ultimately applied to the preprocessed image of the document.

A program embodying the concept of the invention written in "C" language is attached hereto as an appendix to this specification as pages 15 through 19 hereof.

Accordingly, while the invention has been described in detail by specific reference to preferred embodiments thereof, it is understood that variations and modifications thereof may be made without departing from the true spirit and scope of the invention.

Appendix A

```
                        ;COPYRIGHT 1986 FRONTLINE TECHNOLOGY, INC.-
F743*                   CALIBRATE
F743*4C3DE1             JMP MM0  ;^FOR NOW
F746*9C0C02             STZ DACTMF ;ZERO THESE
F749*9C6-02             STZ STARTFLG
F74C*9C2102             STZ SIGNFLG
F74F*A900               LDA #0
F751*8D407F             STA $7F40 ;0 DAC
F754*20930E             JSR RESVAL ;RESET ALL VALUES

F757*                   CALIBRATE0
F757*200FF9             JSR CALIBDSP ;"CALIBRATE" AND "SPEED"
F75A*A922               LDA #$22
F75C*8501               STA ADDR+1
F75E*6400               STZ ADDR
F760*A96E               LDA #LOW M286 ;"PRESS THE "START" MENU KEY TO BEGIN CALIBRATION"
F762*A053               LDY #HIGH M286
F764*2058A3             JSR PRTMSG
F767*A924               LDA #$24
F769*8501               STA ADDR+1
F76B*A99F               LDA #LOW M287 ;"PRESS THE "HELP"..."
F76D*A053               LDY #HIGH M287
F76F*2058A3             JSR PRTMSG

F772*A998               LDA #LOW M195 ;"START"
F774*A04E               LDY #HIGH M195
F776*20E7DA             JSR INVMSGC1 ;1ST SOFTKEY
F779*A96E               LDA #LOW M65 ;"PREVIOUS MENU"
F77B*A041               LDY #HIGH M65
F77D*20F4DA             JSR INVMSGC2 ;2ND SOFTKEY
F780*A9FC               LDA #LOW M81 ;"MAIN MENU"
F782*A042               LDY #HIGH M81
F784*2001DB             JSR INVMSGC3 ;3RD SOFTKEY

F787*                   CALIBRATE2
F787*645F               STZ KEY

F789*                   CALIBRATE3
F789*A55F               LDA KEY ;ANYTHING FROM KEYBOARD?
F78B*F0FC               BEQ CALIBRATE3 ;NO
F78D*C911               CMP #$11 ;START
F78F*F015               BEQ CALIBRATE5
F791*C912               CMP #$12 ;PREVIOUS MENU
F793*D003               BNE *+5
F795*4CC7C0             JMP SETUP
F798*C913               CMP #$13 ;MAIN MENU
F79A*D003               BNE *+5
F79C*4C3D81             JMP MM0
F79F*C93F               CMP #'?' ;HELP
F7A1*D0E4               BNE CALIBRATE2

;HELP MENU HERE
```

```
F7A3*2068BE      JSR BEEP

F7A6*            CALIBRATE5 ;START
F7A6*8D807F      STA $7FB0 ;START A/D
F7A9*AD0A02      LDA STARTFLG ;SAVE
F7AC*48          PHA
F7AD*2069D6      JSR RESVAL ;RESET ALL VALUES
F7B0*68          PLA
F7B1*8D0A02      STA STARTFLG ;RESTORE
F7B4*2068BE      JSR BEEP
F7B7*200FF9      JSR CALIBDSP ;"CALIBRATE" AND "SPEED"
F7BA*A922        LDA #$22
F7BC*8501        STA ADDR+1
F7BE*6400        STZ ADDR
F7C0*A9CA        LDA #LOW M288 ;"PEDAL YOUR BICYCLE..."
F7C2*A053        LDY #HIGH M288
F7C4*2058A3      JSR PRTMSG
F7C7*A980        LDA #$80
F7C9*8500        STA ADDR
F7CB*A980        LDA #LOW M289 ;"YOU HEAR THE BEEP."
F7CD*A054        LDY #HIGH M289
F7CF*2058A3      JSR PRTMSG

F7D2*A939        LDA #LOW M291 ;"CANCEL"
F7D4*A054        LDY #HIGH M291
F7D6*20E7DA      JSR INVMSGC1 ;1ST SOFTKEY
F7D9*209FA8      JSR IRQENABLE ;ENABLE IRQ'S
F7DC*A9C3        LDA #LOW DACDAT ;BEGINNING RAM FOR SPEED
F7DE*851C        STA PNT14
F7E0*A905        LDA #HIGH DACDAT
F7E2*851D        STA PNT14+1
F7E4*A9A0        LDA #LOW CRSDAT ;BEGINNING RAM FOR VOLTAGE
F7E6*851A        STA PNT13
F7E8*A90E        LDA #HIGH CRSDAT
F7EA*851B        STA PNT13+1
F7EC*9C0B02      STZ EXPFLG ;CLR FLG

F7EF*            CALIBRATE6
F7EF*645F        STZ KEY
F7F1*9C2102      STZ SIGNFLG

F7F4*            CALIBRATE7
F7F4*A55F        LDA KEY ;ANYTHING FROM KEYBOARD?
F7F6*D007        BNE CALIBRATE8 ;YES
F7F8*A5A4        LDA TIMER3 ;0.12 SEC?
F7FA*D00A        BNE CALIBRATE9 ;NO
F7FC*4CBCF8      JMP CALIBRATE11

F7FF*            CALIBRATE8
F7FF*C911        CMP #$11 ;CANCEL
F801*D0EC        BNE CALIBRATE6
F803*4C43F7      JMP CALIBRATE

F806*            CALIBRATE9 ;0.12 SEC
F806*202B9D      JSR ADAVG ;RUNNING 10 A/D READINGS
F809*A544        LDA RPMFLG ;A SPEED PULSE YET?
F80B*F0E7        BEQ CALIBRATE7 ;NO
F80D*2062B7      JSR RPMCALC ;CALCULATE SPEED
F810*2C0B02      BIT EXPFLG
F813*7065        BVS CALIBRATE10A ;ALREADY PAST 23 MPH ON COAST DOWN
F815*3043        BMI CALIBRATE10 ;PAST 25 MPH ON UP SIDE
F817*AD2903      LDA SPDHEX ;>25.5 MPH?
F81A*D007        BNE CALIBRATE9A ;YES
F81C*AD2A03      LDA SPDHEX+1 ;25 MPH YET?
F81F*C9FA        CMP #250
F821*90CC        BCC CALIBRATE6 ;NO

F823*            CALIBRATE9A
F823*AD2102      LDA SIGNFLG ;2 TIMES? (MINIMIZE NOISE)
F826*D005        BNE CALIBRATE9A1 ;YES
F828*EE2102      INC SIGNFLG
F82B*80C7        BRA CALIBRATE7
```

```
F82D*                   CALIBRATE9A1
F82D*2068BE             JSR BEEP
F830*A980               LDA #$80
F832*8D0B02             STA EXPFLG
F835*200FF9             JSR CALIBDSP ;"CALIBRATE" AND "SPEED"
F838*A922               LDA #$22
F83A*8501               STA ADDR+1
F83C*6400               STZ ADDR
F83E*A918               LDA #LOW M290 ;"CONTINUE COASTING..."
F840*A054               LDY #HIGH M290
F842*2058A3             JSR PRTMSG
F845*A939               LDA #LOW M291 ;"CANCEL"
F847*A054               LDY #HIGH M291
F849*20E7DA             JSR INVMSGC1 ;1ST SOFTKEY
F84C*2C0A02             BIT STARTFLG ;DAC 105? (2ND COASTDOWN)
F84F*109E               BPL CALIBRATE6 ;NO
F851*A969               LDA #105 ;LOAD DAC WITH 105
F853*8DA07F             STA $7FA0
F856*4CEFF7             JMP CALIBRATE6

F859*                   CALIBRATE10
F859*AD2903             LDA SPDHEX ;>255?
F85C*D091               BNE CALIBRATE6 ;YES
F85E*AD2A03             LDA SPDHEX+1
F861*C9E7               CMP #231 ;CROSSED 230 YET?
F863*9003               BCC *+5
F865*4CEFF7             JMP CALIBRATE6 ;NO
F868*AD2102             LDA SIGNFLG ;2 TIMES?
F86B*D005               BNE CALIBRATE10AA ;YES
F86D*EE2102             INC SIGNFLG
F870*8062               BRA CALIBRATE7

F872*                   CALIBRATE10AA
F872*A9FF               LDA #$FF
F874*8D0B02             STA EXPFLG
F877*4CEFF7             JMP CALIBRATE6

F87A*                   CALIBRATE10A
F87A*2C0A02             BIT STARTFLG ;0 OR 105?
F87D*101D               BPL CALIBRATE10B ;0
F87F*AD2A03             LDA SPDHEX+1
F882*C997               CMP #151 ;15 MPH YET?
F884*9003               BCC *+5
F886*4CEFF7             JMP CALIBRATE6
F889*AD2102             LDA SIGNFLG ;2 TIMES?
F88C*D006               BNE CALIBRATE10A1 ;YES
F88E*EE2102             INC SIGNFLG
F891*4CF4F7             JMP CALIBRATE7

F894*                   CALIBRATE10A1
F894*A900               LDA #0
F896*8DA07F             STA $7FA0 ;RE-ZERO DAC
F899*4C47FA             JMP CALDAC105 ;^FOR NOW

F89C*                   CALIBRATE10B
F89C*AD2A03             LDA SPDHEX+1
F89F*C933               CMP #51 ;CROSSED 5 MPH YET?
F8A1*9003               BCC *+5
F8A3*4CEFF7             JMP CALIBRATE6 ;NO
F8A6*AD2102             LDA SIGNFLG ;2 TIMES?
F8A9*D006               BNE CALIBRATE10B1 ;YES
F8AB*EE2102             INC SIGNFLG
F8AE*4CF4F7             JMP CALIBRATE7

F8B1*                   CALIBRATE10B1
F8B1*2058F9             JSR CALDAC0 ;DO CALCULATION FOR 0
F8B4*A9FF               LDA #$FF
F8B6*8D0A02             STA STARTFLG
F8B9*4CA6F7             JMP CALIBRATE5
```

```
FBBC*                  CALIBRATE11 ;DISPLAY SPEED
FBBC*A903              LDA #3
FBBE*85A4              STA TIMER3
FBC0*202DF9            JSR SPEEDISP
;FBC3*2C0B02           BIT EXPFLG ;CALIBRATION RUNNING?
FBC6*5044              BVC CALIBRATE12 ;NO
.FBC8*A000             LDY #0
FBCA*AD2A03            LDA SPDHEX+1 ;STORE SPEED
FBCD*911C              STA (PNT14),Y
FBCF*E61C              INC PNT14
FBD1*D002              BNE *+4
FBD3*E61D              INC PNT14+1
FBD5*A51D              LDA PNT14+1
FBD7*C940              CMP #$40 ;OUT OF RAM?
FBD9*D006              BNE CALIBRATE11A ;NO
                       ;OVER RAM LIMIT - DISPLAY SOMETHING
FBDB*2068BE            JSR BEEP
FBDE*4CDEF8            JMP *

F8E1*                  CALIBRATE11A
F8E1*2C0A02            BIT STARTFLG
F8E4*1026              BPL CALIBRATE12 ;DAC0

F8E6*                  CALIBRATE11B
F8E6*A000              LDY #0
F8E8*AD4904            LDA ADTOT ;STORE A/D SUM OF 10 READINGS
F8EB*911A              STA (PNT13),Y
F8ED*C8                INY
F8EE*AD4A04            LDA ADTOT+1
F8F1*911A              STA (PNT13),Y
F8F3*18                CLC
F8F4*A51A              LDA PNT13
F8F6*6902              ADC #2
F8F8*851A              STA PNT13
F8FA*A51B              LDA PNT13+1
F8FC*6900              ADC #0
F8FE*851B              STA PNT13+1
F900*A51B              LDA PNT13+1
F902*C940              CMP #$40 ;OUT OF RAM?
F904*D006              BNE CALIBRATE12 ;NO
                       ;OVER RAM - DISPLAY SOMETHING
F906*2068BE            JSR BEEP
F909*4C09F9            JMP *

F90C*                  CALIBRATE12
F90C*4CF4F7            JMP CALIBRATE7

F90F*                  CALIBDSP ;DISPLAY "CALIBRATE" AND "SPEED"
F90F*206BA3            JSR CLRDSP
F912*20C3F5            JSR HVLIN ;HORIZ AND VERT LINES
F915*6400              STZ ADDR
F917*A920              LDA #$20
F919*8501              STA ADDR+1
F91B*A9A9              LDA #LOW M198 ;"CALIBRATION"
F91D*A04E              LDY #HIGH M198
F91F*2058A3            JSR PRTMSG
F922*A924              LDA #$24
F924*8501              STA ADDR+1
F926*A91E              LDA #LOW M213 ;"SPEED"
F928*A04F              LDY #HIGH M213
F92A*4C58A3            JMP PRTMSG

F92D*                  SPEEDISP ;DISPLAY SPEED
F92D*AD2903            LDA SPDHEX
F930*856C              STA HEX+1
F932*AD2A03            LDA SPDHEX+1
F935*856D              STA HEX+2
F937*646B              STZ HEX
F939*201FBA            JSR HEXASC
F93C*A924              LDA #$24
F93E*8501              STA ADDR+1
F940*6400              STZ ADDR
F942*A568              LDA ASCI+5
```

```
F944*A006        LDY #6
F946*9100        STA (ADDR),Y
F948*C8          INY
F949*A569        LDA ASCI+6
F94B*9100        STA (ADDR),Y
F94D*C8          INY
F94E*A92E        LDA #'.'
F950*9100        STA (ADDR),Y
F952*C8          INY
F953*A56A        LDA ASCI+7
F955*9100        STA (ADDR),Y
F957*60          RTS

F958*            CALDAC0;COAST DOWN (0 DAC) COMPLETE

F958*A9C3        LDA #LOW DACDAT ;BEGIN SPEED RAM
F95A*851E        STA PNT15
F95C*A905        LDA #HIGH DACDAT
F95E*851F        STA PNT15+1
F960*20C5FD      JSR RESCALVAL ;RESET CALIB VALUES

F963*            CALDAC0F
F963*6428        STZ MCAND
F965*6429        STZ MCAND+1
F967*A000        LDY #0
F969*A213        LDX #19

F96B*            CALDAC0G ;SUM OF 20 SPEEDS
F96B*18          CLC
F96C*B11E        LDA (PNT15),Y
F96E*6529        ADC MCAND+1
F970*8529        STA MCAND+1
F972*A900        LDA #0
F974*6528        ADC MCAND
F976*8528        STA MCAND
F978*CA          DEX
F979*3008        BMI CALDAC0H
F97B*2036FA      JSR INCPNT15 ;NEXT POINT
F97E*D0EB        BNE CALDAC0G ;NOT DONE YET
F980*4CEDF9      JMP CALDAC0K ;YES

F983*            CALDAC0H
F983*2033F4      JSR RDYFAC
F986*A529        LDA MCAND+1
F988*85DA        STA FACLO
F98A*A528        LDA MCAND
F98C*85D9        STA FACMO
F98E*207565      JSR NORMAL ;NORMALIZE TO FLOATING POINT
F991*A268        LDX #LOW FACTMP1 ;STORE
F993*A003        LDY #HIGH FACTMP1
F995*200D68      JSR MOVMF
F998*AD4903      LDA HRTCNT ;1ST TIME?
F99B*F03A        BEQ CALDAC0I ;YES
F99D*A96D        LDA #LOW FACTMP2 ;GET LAST AVG
F99F*A003        LDY #HIGH FACTMP2
F9A1*20ED64      JSR FSUB ;LAST - THIS AVG
F9A4*204568      JSR MOVAF
F9A7*A991        LDA #LOW INT480 ;480  20*.12*20(AVG)*10(SPEED)
F9A9*A064        LDY #HIGH INT480
F9AB*20DF67      JSR MOVFM
F9AE*20EAFD      JSR FPDIV
F9B1*A268        LDX #LOW FACTMP ;Y
F9B3*A003        LDY #HIGH FACTMP
F9B5*200D68      JSR MOVMF

F9B8*A968        LDA #LOW FACTMP1 ;THIS READING
F9BA*A003        LDY #HIGH FACTMP1
F9BC*20DF67      JSR MOVFM
F9BF*A96D        LDA #LOW FACTMP2 ;LAST READ
F9C1*A003        LDY #HIGH FACTMP2
F9C3*200465      JSR FADD
```

```
F9C6*A9B4          LDA #LOW INT0025 ;0.0025  1/(2*20(AVG)*10(SPEED))
F9C8*A064          LDY #HIGH INT0025
F9CA*206566        JSR FMULT
F9CD*A27C          LDX #LOW ARGTMP ;X
F9CF*A003          LDY #HIGH ARGTMP
F9D1*200D68        JSR MOVMF

F9D4*2038FC        JSR LINREG

F9D7*              CALDAC0I
F9D7*A204          LDX #4 ;STORE THIS AS LAST READ

F9D9*              CALDAC0J
F9D9*BD6803        LDA FACTMP1,X
F9DC*9D6D03        STA FACTMP2,X
F9DF*CA            DEX
F9E0*10F7          BPL CALDAC0J
F9E2*EE4903        INC HRTCNT
F9E5*2036FA        JSR INCPNT15 ;NEXT POINT
F9E8*F003          BEQ CALDAC0K ;DONE
F9EA*4C63F9        JMP CALDAC0F ;NEXT AVG

F9ED*              CALDAC0K
F9ED*2033F4        JSR RDYFAC
F9F0*CE4903        DEC HRTCNT
F9F3*AD4903        LDA HRTCNT ;NEED TO DECREMENT?
F9F6*85DA          STA FACLO
F9F8*20B6FC        JSR ACALC
F9FB*A99B          LDA #LOW INT11829 ;11.829
F9FD*A064          LDY #HIGH INT11829
F9FF*206566        JSR FMULT
FA02*A2E3          LDX #LOW FPV2
FA04*A004          LDY #HIGH FPV2
FA06*200D68        JSR MOVMF

FA09*2023FD        JSR BCALC
FA0C*A99B          LDA #LOW INT11829
FA0E*A064          LDY #HIGH INT11829
FA10*206566        JSR FMULT
FA13*A2DE          LDX #LOW FPV
FA15*A004          LDY #HIGH FPV
FA17*200D68        JSR MOVMF

FA1A*20B0FD        JSR LINREG20 ;CALC AT 20 MPH??
FA1D*A9A0          LDA #LOW INT23658 ;236.58
FA1F*A064          LDY #HIGH INT23658
FA21*206566        JSR FMULT
FA24*A2E8          LDX #LOW FPFR20
FA26*A004          LDY #HIGH FPFR20
FA28*200D68        JSR MOVMF
FA2B*2061FD        JSR RCALC ;DISPLAY R SOMEWHERE????
FA2E*A27A          LDX #LOW FFARG
FA30*A003          LDY #HIGH FFARG
FA32*200D68        JSR MOVMF
                   ;JSR DUMPDATA
FA35*60            RTS
                   ;END DAC 0 CALIBRATION

FA36*              INCPNT15
FA36*E61E          INC PNT15
FA38*D002          BNE *+4
FA3A*E61F          INC PNT15+1
FA3C*A51E          LDA PNT15 ;DONE?
FA3E*C51C          CMP PNT14
FA40*D004          BNE INCPNT15A ;NO
FA42*A51F          LDA PNT15+1
FA44*C51D          CMP PNT14+1

FA46*              INCPNT15A
FA46*60            RTS
```

```
                    ;START DAC 185 CALCULATION.

FA47*               CALDAC185
FA47*20C5FD         JSR RESCALVAL
FA4A*A9C3           LDA #LOW DACDAT  ;SPEEDS
FA4C*851E           STA PNT15
FA4E*A905           LDA #HIGH DACDAT
FA50*851F           STA PNT15+1
FA52*A9A0           LDA #LOW CRSDAT  ;VOLTAGES
FA54*851A           STA PNT13
FA56*A90E           LDA #HIGH CRSDAT
FA58*851B           STA PNT13+1

FA5A*               DAC185F
FA5A*2033F4         JSR RDYFAC
FA5D*A000           LDY #0
FA5F*B11E           LDA (PNT15),Y
FA61*85DA           STA FACLO
FA63*207565         JSR NORMAL
FA66*203B67         JSR DIV10
FA69*A27C           LDX #LOW ARGTMP  ;X
FA6B*A003           LDY #HIGH ARGTMP
FA6D*200D68         JSR MOVMF

FA70*2033F4         JSR RDYFAC
FA73*A000           LDY #0
FA75*B11A           LDA (PNT13),Y
FA77*85D9           STA FACMO
FA79*C8             INY
FA7A*B11A           LDA (PNT13),Y
FA7C*85DA           STA FACLO
FA7E*207565         JSR NORMAL
FA81*A9C4           LDA #LOW INT9765  ;NORMALIZE TO VOLTS
FA83*A063           LDY #HIGH INT9765
FA85*206566         JSR FMULT
FA88*A2C5           LDX #LOW FPACC
FA8A*A003           LDY #HIGH FPACC
FA8C*200D68         JSR MOVMF
FA8F*A9C5           LDA #LOW FPACC
FA91*A003           LDY #HIGH FPACC
FA93*206566         JSR FMULT  ;^2
FA96*A263           LDX #LOW FACTMP  ;Y
FA98*A003           LDY #HIGH FACTMP
FA9A*200D68         JSR MOVMF

FA9D*2038FC         JSR LINREG
FAA0*2036FA         JSR INCPNT15
FAA3*D003           BNE DAC185G  ;NOT DONE YET
FAA5*4CC1FA         JMP DAC185K
FAA8*               DAC185G
FAA8*18             CLC
FAA9*A51A           LDA PNT13
FAAB*6902           ADC #2
FAAD*851A           STA PNT13
FAAF*A51B           LDA PNT13+1
FAB1*6900           ADC #0
FAB3*851B           STA PNT13+1
FAB5*E629           INC MCAND+1  ;NUMBER OF POINTS
FAB7*F003           BEQ *+5
FAB9*4C5AFA         JMP DAC185F
FABC*E628           INC MCAND
FABE*4C5AFA         JMP DAC185F
FAC1*               DAC185K
FAC1*2033F4         JSR RDYFAC
FAC4*18             CLC
FAC5*A529           LDA MCAND+1
FAC7*6901           ADC #1
FAC9*85DA           STA FACLO  ;NEED TO DECREMENT BY 1?
FACB*A528           LDA MCAND
FACD*6900           ADC #0
FACF*85D9           STA FACMO
FAD1*20B6FC         JSR ACALC
FAD4*2023FD         JSR BCALC
FAD7*20B0FD         JSR LINREG20  ;CALC VALUE AT 20 MPH
```

```
FAD0*A2ED        LDX #LOW FPE20
FADC*A004        LDY #HIGH FPE20
FADE*200D68      JSR MOVMF
FAE1*2061FD      JSR RCALC ;DISPLAY SOMEWHERE???
FAE4*A2A2        LDX #LOW FPWIND
FAE6*A004        LDY #HIGH FPWIND
FAE8*200D68      JSR MOVMF
FAEB*20C5FD      JSR RESCALVAL
FAEE*A9C3        LDA #LOW DACDAT
FAF0*851E        STA PNT15
FAF2*A905        LDA #HIGH DACDAT
FAF4*851F        STA PNT15+1

FAF6*            DAC105L
FAF6*6428        STZ MCAND
FAF8*6429        STZ MCAND+1
FAFA*A000        LDY #0
FAFC*A204        LDX #4

FAFE*            DAC105M
FAFE*18          CLC
FAFF*B11E        LDA (PNT15),Y
FB01*6529        ADC MCAND+1
FB03*8529        STA MCAND+1
FB05*A900        LDA #0
FB07*6528        ADC MCAND
FB09*8528        STA MCAND
FB0B*CA          DEX
FB0C*3008        BMI DAC105N
FB0E*2036FA      JSR INCPNT15
FB11*D0EB        BNE DAC105M
FB13*4C91FB      JMP DAC105R

FB16*            DAC105N
FB16*2033F4      JSR RDYFAC
FB19*A529        LDA MCAND+1
FB1B*85DA        STA FACLO
FB1D*A528        LDA MCAND
FB1F*85D9        STA FACMO
FB21*207565      JSR NORMAL
FB24*A268        LDX #LOW FACTMP1
FB26*A003        LDY #HIGH FACTMP1
FB28*200D68      JSR MOVMF
FB2B*AD4903      LDA HRTCNT ;1ST READING?
FB2E*D003        BNE *+5
FB30*4C7BFB      JMP DAC105P ;YES
FB33*A96D        LDA #LOW FACTMP2 ;LAST READ
FB35*A003        LDY #HIGH FACTMP2
FB37*20ED64      JSR FSUB
FB3A*A9A5        LDA #LOW INT033 ;.833333  1/(5*.12*10*5)
FB3C*A064        LDY #HIGH INT033
FB3E*206566      JSR FMULT
FB41*A263        LDX #LOW FACTMP ;Y
FB43*A003        LDY #HIGH FACTMP
FB45*200D68      JSR MOVMF
FB48*A968        LDA #LOW FACTMP1
FB4A*A003        LDY #HIGH FACTMP1
FB4C*20DF67      JSR MOVFM
FB4F*A96D        LDA #LOW FACTMP2
FB51*A003        LDY #HIGH FACTMP2
FB53*2004E5      JSR FADD
FB56*204568      JSR MOVMF
FB59*A919        LDA #LOW INT100 ;2*5*10
FB5B*A064        LDY #HIGH INT100
FB5D*20DF67      JSR MOVFM
FB60*20EAFD      JSR FPDIV
FB63*A27C        LDX #LOW ARGTMP ;X
FB65*A003        LDY #HIGH ARGTMP
FB67*200D69      JSR MOVMF
FB6A*A963        LDA #LOW FACTMP
FB6C*A003        LDY #HIGH FACTMP
FB6E*206566      JSR FMULT
```

```
FB71*A263         LDX #LOW FACTMP ;Y
FB73*A003         LDY #HIGH FACTMP
FB75*200D68       JSR MOVMF
FB78*2038FC       JSR LINREG

FB7B*             DAC105P
FB7B*A204         LDX #4

FB7D*             DAC105Q ;THIS READ TO LAST READING
FB7D*BD6803       LDA FACTMP1,X
FB80*9D6D03       STA FACTMP2,X
FB83*CA           DEX
FB84*10F7         BPL DAC105Q
FB86*EE4903       INC HRTCNT ;NUMBER OF POINTS
FB89*2036FA       JSR INCPNT15 ;NEXT POINT
FB8C*F003         BEQ DAC105R ;DONE
FB8E*4CF6FA       JMP DAC105L ;NEXT AVG

FB91*             DAC105R
FB91*2033F4       JSR RDYFAC
FB94*CE4903       DEC HRTCNT
FB97*AD4903       LDA HRTCNT
FB9A*85DA         STA FACLO
FB9C*20B6FC       JSR ACALC
FB9F*2023FD       JSR BCALC
FBA2*20B0FD       JSR LINREG20
FBA5*A99B         LDA #LOW INT11829
FBA7*A064         LDY #HIGH INT11829
FBA9*206566       JSR FMULT
FBAC*204568       JSR MOVAF
FBAF*A9E8         LDA #LOW FPFR20
FBB1*A004         LDY #HIGH FPFR20
FBB3*20DF67       JSR MOVFM
FBB6*20F064       JSR FSUBT
FBB9*A9ED         LDA #LOW FPE20
FBBB*A004         LDY #HIGH FPE20
FBBD*20C966       JSR CONUPK
FBC0*20EAFD       JSR FPDIV
FBC3*204568       JSR MOVAF
FBC6*A9AA         LDA #LOW INT6029 ;0.6029
FBC8*A064         LDY #HIGH INT6029
FBCA*20DF67       JSR MOVFM
FBCD*20EAFD       JSR FPDIV
FBD0*A2F2         LDX #LOW FPM
FBD2*A004         LDY #HIGH FPM
FBD4*200D68       JSR MOVMF
FBD7*2061FD       JSR RCALC ;DISPLAY SOMEWHERE???

FBDA*             DAC105RA
FBDA*206BA3       JSR CLRDSP
FBDD*20ABA3       JSR DSPONC
FBE0*A920         LDA #$20
FBE2*8501         STA ADDR+1
FBE4*6400         STZ ADDR
FBE6*A9DE         LDA #LOW FPV
FBE8*A004         LDY #HIGH FPV
FBEA*206DFE       JSR FLTPRT
FBED*A921         LDA #$21
FBEF*8501         STA ADDR+1
FBF1*A9E3         LDA #LOW FPV2
FBF3*A004         LDY #HIGH FPV2
FBF5*206DFE       JSR FLTPRT
FBF8*A922         LDA #$22
FBFA*8501         STA ADDR+1
FBFC*A9F2         LDA #LOW FPM
FBFE*A004         LDY #HIGH FPM
FC00*206DFE       JSR FLTPRT
FC03*A923         LDA #$23
FC05*8501         STA ADDR+1
FC07*A9CA         LDA #LOW FPARG
FC09*A003         LDY #HIGH FPARG
FC0B*206DFE       JSR FLTPRT
```

```
FC0E*A924        LDA #$24
FC10*8501        STA ADDR+1
FC12*A9A2        LDA #LOW FPWIND
FC14*A004        LDY #HIGH FPWIND
FC16*206DFE      JSR FLTPRT
FC19*A925        LDA #$25
FC1B*8501        STA ADDR+1
FC1D*A9D9        LDA #LOW FPR
FC1F*A004        LDY #HIGH FPR
FC21*206DFE      JSR FLTPRT
FC24*2068BE      JSR BEEP
                 ;JSR DUMPDATA
FC27*A9FC        LDA #LOW MS1 ;"MAIN MENU"
FC29*A042        LDY #HIGH MS1
FC2B*20E7DA      JSR INVMSGC1

FC2E*            DAC105RB
FC2E*207CA5      JSR KEYIN ;^FOR NOW
FC31*C911        CMP #$11
FC33*D0F9        BNE DAC105RB
FC35*4C4081      JMP MM

;DAC 105 CALCULATION DONE

FC38*            LINREG ;RUNNING LINEAR REGRESSION
FC38*A97C        LDA #LOW ARGTMP ;X
FC3A*A003        LDY #HIGH ARGTMP
FC3C*20DF67      JSR MOVFM
FC3F*A963        LDA #LOW FACTMP ;Y
FC41*A003        LDY #HIGH FACTMP
FC43*206566      JSR FMULT
FC46*A901        LDA #LOW FPSUMXY
FC48*A005        LDY #HIGH FPSUMXY
FC4A*200465      JSR FADD
FC4D*A201        LDX #LOW FPSUMXY
FC4F*A005        LDY #HIGH FPSUMXY
FC51*200D68      JSR MOVMF

FC54*A97C        LDA #LOW ARGTMP ;X
FC56*A003        LDY #HIGH ARGTMP
FC58*20DF67      JSR MOVFM
FC5B*A9F7        LDA #LOW FPSUMX
FC5D*A004        LDY #HIGH FPSUMX
FC5F*200465      JSR FADD
FC62*A2F7        LDX #LOW FPSUMX
FC64*A004        LDY #HIGH FPSUMX
FC66*200D68      JSR MOVMF

FC69*A97C        LDA #LOW ARGTMP ;X
FC6B*A003        LDY #HIGH ARGTMP
FC6D*20DF67      JSR MOVFM
FC70*A97C        LDA #LOW ARGTMP
FC72*A003        LDY #HIGH ARGTMP
FC74*206566      JSR FMULT ;X^2
FC77*A906        LDA #LOW FPSUMXX
FC79*A005        LDY #HIGH FPSUMXX
FC7B*200465      JSR FADD
FC7E*A206        LDX #LOW FPSUMXX
FC80*A005        LDY #HIGH FPSUMXX
FC82*200D68      JSR MOVMF

FC85*A963        LDA #LOW FACTMP ;Y
FC87*A003        LDY #HIGH FACTMP
FC89*20DF67      JSR MOVFM
FC8C*A9FC        LDA #LOW FPSUMY
FC8E*A004        LDY #HIGH FPSUMY
FC90*200465      JSR FADD
FC93*A2FC        LDX #LOW FPSUMY
FC95*A004        LDY #HIGH FPSUMY
FC97*200D68      JSR MOVMF

FC9A*A963        LDA #LOW FACTMP ;Y
```

```
FC9C*A003        LDY #HIGH FACTMP
FC9E*20DF67      JSR MOVFM
FCA1*A963        LDA #LOW FACTMP
FCA3*A003        LDY #HIGH FACTMP
FCA5*206566      JSR FMULT
FCA8*A90B        LDA #LOW FPSUMYY
FCAA*A005        LDY #HIGH FPSUMYY
FCAC*200465      JSR FADD
FCAF*A20B        LDX #LOW FPSUMYY
FCB1*A005        LDY #HIGH FPSUMYY
FCB3*4C0D68      JMP MOVMF

FCB6*            ACALC ;CALCULATE "A"   (Y = AX + B)
FCB6*207565      JSR NORMAL ;NORMALIZE "N"
FCB9*A263        LDX #LOW FACTMP
FCBB*A003        LDY #HIGH FACTMP
FCBD*200D68      JSR MOVMF
FCC0*A9F7        LDA #LOW FPSUMX
FCC2*A004        LDY #HIGH FPSUMX
FCC4*20DF67      JSR MOVFM
FCC7*A9FC        LDA #LOW FPSUMY
FCC9*A004        LDY #HIGH FPSUMY
FCCB*206566      JSR FMULT
FCCE*204568      JSR MOVAF
FCD1*A963        LDA #LOW FACTMP ;N
FCD3*A003        LDY #HIGH FACTMP
FCD5*20DF67      JSR MOVFM
FCD8*20EAFD      JSR FPDIV
FCDB*A901        LDA #LOW FPSUMXY
FCDD*A005        LDY #HIGH FPSUMXY
FCDF*20ED64      JSR FSUB
FCE2*A272        LDX #LOW FACTMP3 ;STORE
FCE4*A003        LDY #HIGH FACTMP3
FCE6*200D68      JSR MOVMF

FCE9*A9F7        LDA #LOW FPSUMX
FCEB*A004        LDY #HIGH FPSUMX
FCED*20DF67      JSR MOVFM
FCF0*A9F7        LDA #LOW FPSUMX
FCF2*A004        LDY #HIGH FPSUMX
FCF4*206566      JSR FMULT
FCF7*204568      JSR MOVAF
FCFA*A963        LDA #LOW FACTMP ;N
FCFC*A003        LDY #HIGH FACTMP
FCFE*20DF67      JSR MOVFM
FD01*20EAFD      JSR FPDIV
FD04*A906        LDA #LOW FPSUMXX
FD06*A005        LDY #HIGH FPSUMXX
FD08*20ED64      JSR FSUB
FD0B*A277        LDX #LOW FACTMP4 ;STORE
FD0D*A003        LDY #HIGH FACTMP4
FD0F*200D68      JSR MOVMF
FD12*A972        LDA #LOW FACTMP3
FD14*A003        LDY #HIGH FACTMP3
FD16*20C966      JSR CONUPK
FD19*20EAFD      JSR FPDIV
FD1C*A2CF        LDX #LOW FPA ;STORE
FD1E*A004        LDY #HIGH FPA
FD20*4C0D68      JMP MOVMF

FD23*            BCALC ;CALCULATE "B"   (Y = AX + B)
FD23*A9FC        LDA #LOW FPSUMY
FD25*A004        LDY #HIGH FPSUMY
FD27*20C966      JSR CONUPK
FD2A*A963        LDA #LOW FACTMP ;N
FD2C*A003        LDY #HIGH FACTMP
FD2E*20DF67      JSR MOVFM
FD31*20EAFD      JSR FPDIV
FD34*A26D        LDX #LOW FACTMP2
FD36*A003        LDY #HIGH FACTMP2
FD38*200D68      JSR MOVMF
FD3B*A9F7        LDA #LOW FPSUMX
FD3D*A004        LDY #HIGH FPSUMX
```

```
FD3F*20C966      JSR CONUPK
FD42*A963        LDA #LOW FACTMP ;N
FD44*A003        LDY #HIGH FACTMP
FD46*20DF67      JSR MOVFM
FD49*20EAFD      JSR FPDIV
FD4C*A9CF        LDA #LOW FPA
FD4E*A004        LDY #HIGH FPA
FD50*206566      JSR FMULT
FD53*A96D        LDA #LOW FACTMP2
FD55*A003        LDY #HIGH FACTMP2
FD57*20ED64      JSR FSUB
FD5A*A2D4        LDX #LOW FPB ;STORE
FD5C*A004        LDY #HIGH FPB
FD5E*4C0D68      JMP MOVMF

FD61*            RCALC ;CALCULATE CORRELATION COEFFICIENT
FD61*A972        LDA #LOW FACTMP3
FD63*A003        LDY #HIGH FACTMP3
FD65*20DF67      JSR MOVFM
FD68*A972        LDA #LOW FACTMP3
FD6A*A003        LDY #HIGH FACTMP3
FD6C*206566      JSR FMULT
FD6F*A268        LDX #LOW FACTMP1 ;STORE
FD71*A003        LDY #HIGH FACTMP1
FD73*200D68      JSR MOVMF
FD76*A9FC        LDA #LOW FPSUMY
FD78*A004        LDY #HIGH FPSUMY
FD7A*20DF67      JSR MOVFM
FD7D*A9FC        LDA #LOW FPSUMY
FD7F*A004        LDY #HIGH FPSUMY
FD81*206566      JSR FMULT
FD84*204568      JSR MOVAF
FD87*A963        LDA #LOW FACTMP ;N
FD89*A003        LDY #HIGH FACTMP
FD8B*20DF67      JSR MOVFM
FD8E*20EAFD      JSR FPDIV
FD91*A90B        LDA #LOW FPSUMYY
```

Appendix B

```
                 ;COPYRIGHT 1986 FRONTLINE TECHNOLOGY, INC.
896E             POWERCALC ;CALCULATE POWER
896E A99C        LDA #LOW FPGRADE
8970 A004        LDY #HIGH FPGRADE
8972 20DF67      JSR MOVFM

8975 A9A2        LDA #LOW FPWIND
8977 A004        LDY #HIGH FPWIND
8979 200465      JSR FADD

897C             POWERCALC0
897C 240B        BIT FACSGN ;NEGATIVE?
897E 1004        BPL POWERCALC1
8980 9CCF03      STZ FPPOWER ;YES, MAKE 0
8983 60          RTS

8984             POWERCALC1
8984 A96E        LDA #LOW FPSPEED
8986 A004        LDY #HIGH FPSPEED
8988 206566      JSR FMULT
898B A9F1        LDA #LOW INT0447 ;0.0447 (MPH TO METERS/SEC, DIV BY 10)
898D A063        LDY #HIGH INT0447
898F 206566      JSR FMULT
8992 A2CF        LDX #LOW FPPOWER
8994 A003        LDY #HIGH FPPOWER
8996 200D68      JSR MOVMF
8999 60          RTS

899A             GRADECALC ;CALCULATE GRADE POWER
899A AD4203      LDA GRADE
899D 207568      JSR FLOAT
89A0 A9D3        LDA #LOW INT4448
89A2 A063        LDY #HIGH INT4448
```

```
89A4 206566        JSR FMULT
89A7 A9CE          LDA #LOW INT0178
89A9 A063          LDY #HIGH INT0178
89AB 200465        JSR FADD
89AE A998          LDA #LOW FPWEIGHT
89B0 A004          LDY #HIGH FPWEIGHT
89B2 206566        JSR FMULT
89B5 A29D          LDX #LOW FPGRADE
89B7 A004          LDY #HIGH FPGRADE
89B9 200D68        JSR MOVMF
89BC 60            RTS

89BD               WINDCALC
89BD A998          LDA #LOW FPWEIGHT
89BF A004          LDY #HIGH FPWEIGHT
89C1 20DF67        JSR MOVFM
89C4 A9E7          LDA #LOW INT205 ;0.0002055556
89C6 A063          LDY #HIGH INT205
89C8 206566        JSR FMULT
89CB A9E2          LDA #LOW INT226 ;0.002266667
89CD A063          LDY #HIGH INT226
89CF 200465        JSR FADD
89D2 A263          LDX #LOW FACTMF
89D4 A003          LDY #HIGH FACTMF
89D6 200D68        JSR MOVMF
89D9 A993          LDA #LOW FPSPEED10
89DB A004          LDY #HIGH FPSPEED10
89DD 200566        JSR CONUPK
89E0 A9EC          LDA #LOW INT2 ;^2
89E2 A063          LDY #HIGH INT2
89E4 20DF67        JSR MOVFM
89E7 20926B        JSR FPWRT
89EA A963          LDA #LOW FACTMF
89EC A003          LDY #HIGH FACTMF
89EE 206566        JSR FMULT
89F1 AD6905        LDA WINDLOADFLG
89F4 D008          BNE WINDCALC2

89F6               WINDCALC1
89F6 A2A2          LDX #LOW FPWIND
89F8 A004          LDY #HIGH FPWIND
89FA 200D68        JSR MOVMF
89FD 60            RTS

89FE               WINDCALC2
89FE A90F          LDA #LOW INTPT7 ;0.70
8A00 A064          LDY #HIGH INTPT7
8A02 206566        JSR FMULT
8A05 80EF          BRA WINDCALC1

8A07               SPEEDDIV10
8A07 A98E          LDA #LOW FPSPEED
8A09 A004          LDY #HIGH FPSPEED
8A0B 20DF67        JSR MOVFM
8A0E 203B67        JSR DIV10
8A11 A293          LDX #LOW FPSPEED10
8A13 A004          LDY #HIGH FPSPEED10
8A15 200D68        JSR MOVMF
8A18 60            RTS

8A19               PAGE
8A19               DACCALC ;CALCULATE DAC VALUE AND LOAD
8A19 2033F4        JSR RDYFAC
8A1C AD4A04        LDA ADTOT+1
8A1F 85DA          STA FACLO
8A21 AD4904        LDA ADTOT
8A24 85D9          STA FACMO
8A26 207565        JSR NORMAL
8A29 A9C4          LDA #LOW INT9765 ;.009765625
8A2B A063          LDY #HIGH INT9765
8A2D 206566        JSR FMULT ;NORMALIZE TO VOLTS
8A30 A2C5          LDX #LOW FPACC
8A32 A003          LDY #HIGH FPACC
```

```
8A34 200D68      JSR MOVMF
8A37 A9C5        LDA #LOW FPACC
8A39 A003        LDY #HIGH FPACC
8A3B 206566      JSR FMULT ;^2
8A3E A993        LDA #LOW FPSPEED10 ;SPEED/10
8A40 A004        LDY #HIGH FPSPEED10
8A42 206566      JSR FMULT
8A45 A9F6        LDA #LOW INT1408 ;14.08
8A47 A063        LDY #HIGH INT1408
8A49 206566      JSR FMULT
8A4C A263        LDX #LOW FACTMP
8A4E A003        LDY #HIGH FACTMP
8A50 200D68      JSR MOVMF ;SAVE
8A53 A956        LDA #LOW INT1
8A55 A063        LDY #HIGH INT1
8A57 20C966      JSR CONUPK
8A5A A993        LDA #LOW FPSPEED10
8A5C A004        LDY #HIGH FPSPEED10
8A5E 20DF67      JSR MOVFM
8A61 20EAFD      JSR FPDIV ;1/V
8A64 A937        LDA #LOW INTE
8A66 A064        LDY #HIGH INTE
8A68 20C966      JSR CONUPK
8A6B A5D6        LDA FACEXP ;GET READY FOR FPWRT
8A6D 20926B      JSR FPWRT

8A70 A9FB        LDA #LOW INT12832 ;0.12832
8A72 A063        LDY #HIGH INT12832
8A74 206566      JSR FMULT
8A77 204568      JSR MOVAF
8A7A A900        LDA #LOW INT12903
8A7C A064        LDY #HIGH INT12903
8A7E 20DF67      JSR MOVFM
8A81 20F064      JSR FSUBT
8A84 A963        LDA #LOW FACTMP
8A86 A003        LDY #HIGH FACTMP
8A88 206566      JSR FMULT
8A8B A9F2        LDA #LOW FPM
8A8D A004        LDY #HIGH FPM
8A8F 206566      JSR FMULT
8A92 A263        LDX #LOW FACTMP
8A94 A003        LDY #HIGH FACTMP
8A96 200D68      JSR MOVMF

8A99 A993        LDA #LOW FPSPEED10
8A9B A004        LDY #HIGH FPSPEED10
8A9D 20DF67      JSR MOVFM
8AA0 A9DE        LDA #LOW FPV
8AA2 A004        LDY #HIGH FPV
8AA4 206566      JSR FMULT
8AA7 A2CA        LDX #LOW FPARG
8AA9 A003        LDY #HIGH FPARG
8AAB 200D68      JSR MOVMF ;SAVE
8AAE A993        LDA #LOW FPSPEED10
8AB0 A004        LDY #HIGH FPSPEED10
8AB2 20DF67      JSR MOVFM
8AB5 A993        LDA #LOW FPSPEED10
8AB7 A004        LDY #HIGH FPSPEED10
8AB9 206566      JSR FMULT
8ABC A9E3        LDA #LOW FPV2
8ABE A004        LDY #HIGH FPV2
8AC0 206566      JSR FMULT
8AC3 A9CA        LDA #LOW FPARG
8AC5 A003        LDY #HIGH FPARG
8AC7 200465      JSR FADD
8ACA A963        LDA #LOW FACTMP
8ACC A003        LDY #HIGH FACTMP
8ACE 200465      JSR FADD
8AD1 A255        LDX #LOW FPRPWR ;REAL POWER
8AD3 A004        LDY #HIGH FPRPWR
8AD5 200D68      JSR MOVMF
```

```
8AD8                    DACCALC9 ;KEEP RUNNING STACK OF 10
8AD8 18                 CLC
8AD9 A982               LDA #LOW FPRPWRSUM+40
8ADB 8522               STA PNT17
8ADD 6905               ADC #5
8ADF 8520               STA PNT16
8AE1 A904               LDA #HIGH FPRPWRSUM+40
8AE3 8523               STA PNT17+1
8AE5 6900               ADC #0
8AE7 8521               STA PNT16+1
8AE9 A208               LDX #8

8AEB                    DACCALC10
8AEB A004               LDY #4

8AED                    DACCALC11
8AED B122               LDA (PNT17),Y
8AEF 9120               STA (PNT16),Y
8AF1 88                 DEY
8AF2 10F9               BPL DACCALC11
8AF4 CA                 DEX
8AF5 3013               BMI DACCALC12
8AF7 38                 SEC
8AF8 A522               LDA PNT17
8AFA 8520               STA PNT16
8AFC E905               SBC #5
8AFE 8522               STA PNT17
8B00 A523               LDA PNT17+1
8B02 8521               STA PNT16+1
8B04 E900               SBC #0
8B06 8523               STA PNT17+1
8B08 80E1               BRA DACCALC10

8B0A                    DACCALC12
8B0A A25A               LDX #LOW FPRPWRSUM
8B0C A004               LDY #HIGH FPRPWRSUM
8B0E 200D68             JSR MOVMF

8B11 A9CF               LDA #LOW FPPOWER
8B13 A003               LDY #HIGH FPPOWER
8B15 20C966             JSR CONUPK
8B18 20EAFD             JSR FPDIV
8B1B A263               LDX #LOW FACTMP ;SAVE
8B1D A003               LDY #HIGH FACTMP
8B1F 200D68             JSR MOVMF
8B22 A956               LDA #LOW INT1 ;<1?
8B24 A063               LDY #HIGH INT1
8B26 209468             JSR FCOMP
8B29 3008               BMI DACCALC00 ;YES
8B2B AD0C02             LDA DACTMP ;ALREADY AT FULL LOAD?
8B2E C9FF               CMP #$FF
8B30 D001               BNE *+3 ;NO
8B32 60                 RTS ;YES. RETURN WITHOUT CHANGING

8B33                    DACCALC00
8B33 A963               LDA #LOW FACTMP
8B35 A003               LDY #HIGH FACTMP
8B37 20DF67             JSR MOVFM
8B3A A9D8               LDA #LOW INT14 ;1.4
8B3C A063               LDY #HIGH INT14
8B3E 209468             JSR FCOMP
8B41 3006               BMI DACCALC8 ;OK, <1.4
                        ;JSR BEEP ;^TEST
8B43 A9D8               LDA #LOW INT14 ;LOAD WITH 1.4
8B45 A063               LDY #HIGH INT14
8B47 8004               BRA DACCALC8A

8B49                    DACCALC8
8B49 A963               LDA #LOW FACTMP ;GET VALUE BACK
8B4B A003               LDY #HIGH FACTMP

8B4D                    DACCALC8A
8B4D 20DF67             JSR MOVFM
```

```
8B50 A944         LDA #LOW FPDAC
8B52 A004         LDY #HIGH FPDAC
8B54 206566       JSR FMULT
8B57 A244         LDX #LOW FPDAC
8B59 A004         LDY #HIGH FPDAC
8B5B 200D68       JSR MOVMF
8B5E 20E664       JSR FADDH
8B61 20D469       JSR QINT
8B64 A5D8         LDA FACMOH ;>255?
8B66 F004         BEQ DACCALC2 ;MAYBE NOT

8B68              DACCALC1
8B68 A9FF         LDA #$FF ;LOAD DAC PRETTY HEAVILY
8B6A 8015         BRA DACCALC4

8B6C              DACCALC2 ;TRY NEXT BYTE
8B6C A5D9         LDA FACMO
8B6E D0F8         BNE DACCALC1
8B70 A5DA         LDA FACLO
8B72 D00D         BNE DACCALC4
8B74 A204         LDX #4

8B76              DACCALC3
8B76 BDC963       LDA INT10,X
8B79 9D4404       STA FPDAC,X
8B7C CA           DEX
8B7D 10F7         BPL DACCALC3
8B7F A90A         LDA #10

8B81              DACCALC4
8B81 8D0C02       STA DACTMP
8B84 8DA07F       STA $7FA0
8B87 60           RTS

FD93*A005         LDY #HIGH FPSUMYY
FD95*20ED64       JSR FSUB

FD98*A977         LDA #LOW FACTMP4
FD9A*A003         LDY #HIGH FACTMP4
FD9C*206566       JSR FMULT
FD9F*A968         LDA #LOW FACTMP1
FDA1*A003         LDY #HIGH FACTMP1
FDA3*20C966       JSR CONUFK
FDA6*20EAFD       JSR FPDIV
FDA9*A2D9         LDX #LOW FPR ;STORE
FDAB*A004         LDY #HIGH FPR
FDAD*4C0D68       JMP MOVMF

FDB0*             LINREG20 ;CALCULATE Y AT 20 MPH
FDB0*A9AF         LDA #LOW INT20
FDB2*A064         LDY #HIGH INT20
FDB4*20DF67       JSR MOVFM
FDB7*A9CF         LDA #LOW FPA
FDB9*A004         LDY #HIGH FPA
FDBB*206566       JSR FMULT
FDBE*A9D4         LDA #LOW FPB
FDC0*A004         LDY #HIGH FPB
FDC2*4C0465       JMP FADD

FDC5*             RESCALVAL ;RESET CALIBRATION VALUES
FDC5*6428         STZ MCAND
FDC7*6429         STZ MCAND+1
FDC9*9CF704       STZ FPSUMX
FDCC*9CFC04       STZ FPSUMY
FDCF*9C0105       STZ FPSUMXY
FDD2*9C0605       STZ FPSUMXX
FDD5*9C0B05       STZ FPSUMYY
FDD8*9C4903       STZ HRTCNT
FDDB*60           RTS
```

;COPYRIGHT 1986 FRONTLINE TECHNOLOGY, INC.

```
AC43*              RIDCOR ;RIDE COURSE
AC43*2068BE        JSR BEEP
AC46*9C4403        STZ TIMTRLFLG
AC49*AD1403        LDA RIDLEVEL
AC4C*D005          BNE RIDCOR3
AC4E*A980          LDA #$80
AC50*8D4403        STA TIMTRLFLG ;IGNORE PACK POSITION

AC53*              RIDCOR3
AC53*20728D        JSR LDINITDAC
AC56*9C0A02        STZ STARTFLG
AC59*9C0E03        STZ EXPFLG
AC5C*2003C4        JSR MENU1
AC5F*20A3A5        JSR DSPCRS ;DISPLAY COURSE
AC62*206BC3        JSR PRTLEVEL
AC65*2C4403        BIT TIMTRLFLG ;TIME TRIAL?
AC68*3003          BMI *+5 ;YES, FORGET PACK POSITION
AC6A*2009EA        JSR MENU27
AC6D*200BC7        JSR MENU2SOFT
AC70*648E          STZ DIST
AC72*2088D6        JSR RESVAL
AC75*202EB3        JSR RIDCURS

AC78*              RIDCOR4
AC78*645F          STZ KEY
AC7A*20D3C2        JSR KEYIN1
AC7D*F0FB          BEQ *-3
AC7F*C911          CMP #$11 ;START
AC81*D003          BNE *+5
AC83*4CA4AC        JMP RIDCOR5
AC86*C912          CMP #$12 ;EXPAND SCREEN
AC88*D003          BNE *+5
AC8A*4C05B0        JMP RIDCOR6
AC8D*C913          CMP #$13 ;RESET VALUES
AC8F*D009          BNE RIDCOR4A
AC91*2068BE        JSR BEEP
AC94*2088D6        JSR RESVAL
AC97*4C53AC        JMP RIDCOR3

AC9A*              RIDCOR4A
AC9A*C914          CMP #$14 ;PREVIOUS MENU
AC9C*D0DA          BNE RIDCOR4 ;INVALID KEY
AC9E*2096C0        JSR CHRLD
ACA1*4CEF86        JMP RUN

ACA4*              RIDCOR5 ;START
ACA4*2068BE        JSR BEEP
ACA7*AD0A02        LDA STARTFLG
ACAA*F003          BEQ *+5 ;NEW ENTRY
ACAC*4CE8AC        JMP RIDCOR5BA
ACAF*2003C4        JSR MENU1 ;REWRITE
ACB2*A58E          LDA DIST
ACB4*48            PHA
ACB5*20A3A5        JSR DSPCRS
ACB8*68            PLA
ACB9*858E          STA DIST
ACBB*202EB3        JSR RIDCURS
ACBE*206BC3        JSR PRTLEVEL
ACC1*2C4403        BIT TIMTRLFLG ;TIME TRIAL?
ACC4*3003          BMI *+5 ;YES
ACC6*20FFEA        JSR MENU28 ;PACK POSITION WITHOUT NAMES
ACC9*2004C5        JSR MENU14SOFT
ACCC*A980          LDA #$80 ;MAKE AVG IN CENTER
ACCE*8D4603        STA AVGHRT

ACD1*              RIDCOR5A1
ACD1*78            SEI
ACD2*2088D6        JSR RESVAL
ACD5*20C3EE        JSR UPDATE
ACD8*648E          STZ DIST
ACDA*202EB3        JSR RIDCURS
ACDD*A9FF          LDA #$FF
```

```
ACDF*8D0A02        STA STARTFLG
ACE2*6473          STZ DGCNT1
ACE4*649E          STZ DISTLAST
ACE6*8013          BRA RIDCOR5BB

ACE8*              RIDCOR5BA
ACE8*A9FF          LDA #$FF ;INDICATE NOW RUNNING
ACEA*8D0A02        STA STARTFLG
ACED*2004C5        JSR MENU1ASOFT
ACF0*2C4403        BIT TIMTRLFLG
ACF3*3006          BMI *+8
ACF5*20BEEA        JSR MENU2BCLR
ACF8*207FEA        JSR MENU2B

ACFB*              RIDCOR5BB
ACFB*209FA8        JSR IRQENABLE ;ENABLE T1, CB1, CA1, CA2
ACFE*A909          LDA #9
AD00*8D4903        STA HRTCNT
AD03*9C0B02        STZ EXPFLG ;CLR EXPAND FLG

AD06*              RIDCOR5AA
AD06*A673          LDX DGCNT1
AD08*BD9B02        LDA GRDHEX,X ;GET GRADE
AD0B*8D4203        STA GRADE
AD0E*2019BA        JSR HEXASCSHRT
AD11*A569          LDA ASCI+6
AD13*8D0603        STA GRDASC+1
AD16*A56A          LDA ASCI+7
AD18*8D0703        STA GRDASC+2
AD1B*A673          LDX DGCNT1
AD1D*BDD702        LDA SIGNCX,X
AD20*8D0503        STA GRDASC
AD23*8D2002        STA SIGNN
AD26*C920          CMP #$20
AD28*F008          BEQ RIDCOR5A2
AD2A*A980          LDA #$80 ;MAKE GRADE NEGATIVE
AD2C*0D4203        ORA GRADE
AD2F*8D4203        STA GRADE

AD32*              RIDCOR5A2
AD32*209A89        JSR GRADECALC
AD35*A964          LDA #100 ;5 SEC DELAY
AD37*85A6          STA TIMER5
AD39*9C6E05        STZ RANDISTSAVE ;0 RANDOM DISTANCE

AD3C*              RIDCOR5AE
AD3C*645F          STZ KEY
AD3E*4C9BAF        JMP RIDCOR5F ;GET PACK SPEED

AD41*              RIDCOR5A
AD41*8D6D03        STA FACTMF2
AD44*2003C2        JSR KEYIN1
AD47*F03D          BEQ RIDCOR5B
AD49*C911          CMP #$11
AD4B*D003          BNE *+5
AD4D*4C7DB1        JMP RIDCOR8 ;STOP
AD50*2C0B02        BIT EXPFLG ;EXPAND?
AD53*301C          BMI RIDCOR5CC ;YES
AD55*C912          CMP #$12 ;EXPAND
AD57*D003          BNE *+5
AD59*4CB6B0        JMP RIDCOR6B
AD5C*C913          CMP #$13 ;PREVIOUS MENU
AD5E*D003          BNE *+5
AD60*4CAAB1        JMP RIDCOR9 ;BACK TO PREVIOUS MENU
AD63*C914          CMP #$14
AD65*D0D5          BNE RIDCOR5AB ;INVALID KEY
AD67*2068BE        JSR BEEP
AD6A*A204          LDX #4 ;ROW 4
AD6C*208892        JSR HRBEEPTOGGLEL
AD6F*80CB          BRA RIDCOR5AB

AD71*              RIDCOR5CC ;EXPAND MODE
AD71*C912          CMP #$12 ;PREVIOUS (NORMAL SCREEN) MENU
```

```
AD73*D003      BNE *+5
AD75*4CE9B1    JMP RIDCOR12
AD78*C913      CMP #$13
AD7A*D0C0      BNE RIDCOR5AB
AD7C*2068BE    JSR BEEP
AD7F*A203      LDX #3 ;ROW 3
AD81*208892    JSR HRBEEPTOGGLEL
AD84*80B6      BRA RIDCOR5AB

AD86*          RIDCOR5B

AD86*2062B7    JSR RPMCALC
AD89*20D1B7    JSR CADCALC
AD8C*204CB8    JSR HEARTCALC

AD8F*202B8D    JSR ADAVG

AD92*A5A4      LDA TIMER3

AD94*F01A      BEQ RIDCOR5C
AD96*A5A3      LDA TIMER2
AD98*D003      BNE *+5
AD9A*4C22AE    JMP RIDCOR5D
AD9D*A5A7      LDA TIMER6
AD9F*D003      BNE *+5
ADA1*4CF2AF    JMP RIDCOR5H
ADA4*2C4403    BIT TIMTRLFLG ;0?
ADA7*30F3      BMI RIDCOR5A ;YES, SKIP PACK POS
ADA9*A5A5      LDA TIMER4
ADAB*D0F4      BNE RIDCOR5A
ADAD*4C9BAF    JMP RIDCOR5F

ADB0*          RIDCOR5C
ADB0*A903      LDA #3
ADB2*85A4      STA TIMER3

ADB4*20E1B6    JSR DISTCALC
ADB7*38        SEC
ADB8*A58E      LDA DIST
ADBA*E59E      SBC DISTLAST ;GET DISTANCE SO FAR IN THIS SEGMENT
ADBC*A673      LDX DGCNT1
ADBE*DDB902    CMP DSTHEX,X
ADC1*D059      BNE RIDCOR5C2 ;OK, NOT THERE YET
ADC3*E673      INC DGCNT1
ADC5*9CDF03    STZ DGCNTFLG
ADC8*A673      LDX DGCNT1
ADCA*E472      CPX DGCNT
ADCC*D003      BNE *+5 ;OK, NOT COMPLETELY DONE
ADCE*4C0FE2    JMP RIDCOR14 ;^FOR NOW, STOP
ADD1*BD9B02    LDA GRDHEX,X
ADD4*8D4203    STA GRADE
ADD7*2019BA    JSR HEXASCSHRT
ADDA*A569      LDA ASCI+6
ADDC*8D0603    STA GRDASC+1
ADDF*A56A      LDA ASCI+7
ADE1*8D0703    STA GRDASC+2
ADE4*A673      LDX DGCNT1
ADE6*BDD702    LDA SIGNCX,X
ADE9*8D0503    STA GRDASC
ADEC*8D2002    STA SIGNN
ADEF*C920      CMP #$20
ADF1*F019      BEQ RIDCOR5C0
ADF3*AD4203    LDA GRADE ;MAKE NEGATIVE
ADF6*0980      ORA #$80
ADF8*8D4203    STA GRADE
ADFB*BDD602    LDA SIGNCX-1,X ;WAS LAST SEGMENT POSITIVE?
ADFE*C920      CMP #$20
AE00*D00A      BNE RIDCOR5C0 ;NO
AE02*A964      LDA #100 ;YES, LOAD 5 SEC DELAY
AE04*85A6      STA TIMER5
AE06*AD0602    LDA RANDIST
AE09*8D6B05    STA RANDISTSAVE

AE0C*          RIDCOR5C0
```

```
AE0C*20°A89      JSR GRADECALC
AE0F*20A5AF      JSR RANDISTCALC

AE12*            RIDCOR5C1
AE12*18          CLC
AE13*A673        LDX DGCNT1
AE15*BDE902      LDA DSTHEX-1,X ;ADD PREVIOUS DISTANCE
AE18*659E        ADC DISTLAST
AE1A*859E        STA DISTLAST

AE1C*            RIDCOR5C2
AE1C*202EB3      JSR RIDCURS
AE1F*4C41AD      JMP RIDCOR5A

AE22*            RIDCOR5D
AE22*A542        LDA TIMER1
AE24*8543        STA TIMER2
AE26*20C3BE      JSR UPDATE
AE29*2C4403      BIT TIMTRLFLG ;0?
AE2C*1003        BPL *+5
AE2E*4C41AD      JMP RIDCOR5A ;YES, SKIP PACK POSITION

AE31*            RIDCOR5D0

AE31*18          CLC
AE32*A5A6        LDA TIMER5 ;DELAY STILL ON?
AE34*F008        BEQ RIDCOR5D0A ;NO
AE36*AD0202      LDA PHANTDIST+2
AE39*6D6B05      ADC RANDISTSAVE
AE3C*8006        BRA RIDCOR5D0B

AE3E*            RIDCOR5D0A
AE3E*AD0202      LDA PHANTDIST+2
AE41*6D0602      ADC RANDIST

AE44*            RIDCOR5D0B
AE44*8D0202      STA PHANTDIST+2
AE47*AD0102      LDA PHANTDIST+1
AE4A*6900        ADC #0
AE4C*8D0102      STA PHANTDIST+1
AE4F*AD0002      LDA PHANTDIST
AE52*6900        ADC #0
AE54*8D0002      STA PHANTDIST
AE57*9C0802      STZ DISTDIR ;MAKE POSITIVE TO START
AE5A*38          SEC
AE5B*78          SEI
AE5C*AD5D03      LDA RPMDIST+2
AE5F*ED0202      SBC PHANTDIST+2
AE62*8D0502      STA DISTDIFF+2
AE65*AD5C03      LDA RPMDIST+1
AE68*ED0102      SBC PHANTDIST+1
AE6B*8D0402      STA DISTDIFF+1
AE6E*AD5B03      LDA RPMDIST
AE71*ED0002      SBC PHANTDIST
AE74*8D0302      STA DISTDIFF

AE77*58          CLI
AE78*B003        BCS *+5
AE7A*4C0CAF      JMP RIDCOR5D5 ;NEGATIVE

AE7D*            RIDCOR5D1
AE7D*38          SEC
AE7E*AD0502      LDA DISTDIFF+2
AE81*E928        SBC #$28 ;1320 FEET
AE83*AD0402      LDA DISTDIFF+1
AE86*E905        SBC #5
AE88*AD0302      LDA DISTDIFF
AE8B*E900        SBC #0
AE8D*9005        BCC RIDCOR5D1A
AE8F*A92D        LDA #45
AE91*4CE7E2      JMP PACKDISP0 ;FULL WINDLOAD
```

```
AE94*              RIDCOR5D1A
AE94*38            SEC
AE95*AD0502        LDA DISTDIFF+2
AE98*E978          SBC #120 ;120 FEET
AE9A*AD0402        LDA DISTDIFF+1
AE9D*E900          SBC #0
AE9F*AD0302        LDA DISTDIFF
AEA2*E900          SBC #0
AEA4*9005          BCC RIDCOR5D2
AEA6*A92B          LDA #43
AEA8*4CB7B2        JMP PACKDISP0 ;FULL WINDLOAD

AEAB*              RIDCOR5D2
AEAB*38            SEC
AEAC*AD0502        LDA DISTDIFF+2
AEAF*E964          SBC #100 ;100 FEET
AEB1*AD0402        LDA DISTDIFF+1
AEB4*E900          SBC #0
AEB6*AD0302        LDA DISTDIFF
AEB9*E900          SBC #0
AEBB*9005          BCC RIDCOR5D2A
AEBD*A927          LDA #39
AEBF*4CBCB2        JMP PACKDISP

AEC2*              RIDCOR5D2A
AEC2*38            SEC
AEC3*AD0502        LDA DISTDIFF+2
AEC6*E950          SBC #80 ;80 FEET
AEC8*AD0402        LDA DISTDIFF+1
AECB*E900          SBC #0
AECD*AD0302        LDA DISTDIFF
AED0*E900          SBC #0
AED2*9005          BCC RIDCOR5D3
AED4*A926          LDA #38
AED6*4CBCB2        JMP PACKDISP

AED9*              RIDCOR5D3
AED9*38            SEC
AEDA*AD0502        LDA DISTDIFF+2
AEDD*E93C          SBC #60 ;60 FEET
AEDF*AD0402        LDA DISTDIFF+1
AEE2*E900          SBC #0
AEE4*AD0302        LDA DISTDIFF
AEE7*E900          SBC #0
AEE9*9005          BCC RIDCOR5D3A
AEEB*A925          LDA #37
AEED*4CBCB2        JMP PACKDISP

AEF0*              RIDCOR5D3A
AEF0*38            SEC
AEF1*AD0502        LDA DISTDIFF+2
AEF4*E928          SBC #40 ;40 FEET
AEF6*AD0402        LDA DISTDIFF+1
AEF9*E900          SBC #0
AEFB*AD0302        LDA DISTDIFF
AEFE*E900          SBC #0
AF00*9005          BCC RIDCOR5D4
AF02*A924          LDA #36
AF04*4CBCB2        JMP PACKDISP

AF07*              RIDCOR5D4
AF07*A923          LDA #35 ;LESS THAN 40 FEET
AF09*4CBCB2        JMP PACKDISP

AF0C*              RIDCOR5D5
AF0C*38            SEC
AF0D*AD0502        LDA DISTDIFF+2
AF10*E9D8          SBC #$D8 ;-1320 FEET
AF12*AD0402        LDA DISTDIFF+1
AF15*E9FA          SBC #$FA
AF17*AD0302        LDA DISTDIFF
AF1A*E9FF          SBC #$FF
```

```
AF1C*B005            BCS RIDCOR5D5A
AF1E*A919            LDA #25 ;>1320 FEET OFF
AF20*4CB7B2          JMP PACKDISP0 ;FULL WINDLOAD

AF23*                RIDCOR5D5A
AF23*38              SEC
AF24*AD0502          LDA DISTDIFF+2
AF27*E988            SBC #$88 ;-120 FEET
AF29*AD0402          LDA DISTDIFF+1
AF2C*E9FF            SBC #$FF
AF2E*AD0302          LDA DISTDIFF
AF31*E9FF            SBC #$FF
AF33*B005            BCS RIDCOR5D6
AF35*A91B            LDA #27 ;>120 FEET OFF
AF37*4CB7B2          JMP PACKDISP0 ;FULL WINDLOAD

AF3A*                RIDCOR5D6
AF3A*38              SEC
AF3B*AD0502          LDA DISTDIFF+2
AF3E*E99C            SBC #$9C ;-100 FEET
AF40*AD0402          LDA DISTDIFF+1
AF43*E9FF            SBC #$FF
AF45*AD0302          LDA DISTDIFF
AF48*E9FF            SBC #$FF
AF4A*B005            BCS RIDCOR5D6A
AF4C*A91F            LDA #31
AF4E*4CBCB2          JMP PACKDISP

AF51*                RIDCOR5D6A
AF51*38              SEC
AF52*AD0502          LDA DISTDIFF+2
AF55*E9B0            SBC #$B0 ;-80 FEET
AF57*AD0402          LDA DISTDIFF+1
AF5A*E9FF            SBC #$FF
AF5C*AD0302          LDA DISTDIFF
AF5F*E9FF            SBC #$FF
AF61*B005            BCS RIDCOR5D7
AF63*A920            LDA #32
AF65*4CBCB2          JMP PACKDISP

AF68*                RIDCOR5D7
AF68*38              SEC
AF69*AD0502          LDA DISTDIFF+2
AF6C*E9C4            SBC #$C4 ;-60 FEET
AF6E*AD0402          LDA DISTDIFF+1
AF71*E9FF            SBC #$FF
AF73*AD0302          LDA DISTDIFF
AF76*E9FF            SBC #$FF
AF78*B005            BCS RIDCOR5D7A
AF7A*A921            LDA #33
AF7C*4CBCB2          JMP PACKDISP

AF7F*                RIDCOR5D7A
AF7F*38              SEC
AF80*AD0502          LDA DISTDIFF+2
AF83*E9D8            SBC #$D8 ;-40 FEET
AF85*AD0402          LDA DISTDIFF+1
AF88*E9FF            SBC #$FF
AF8A*AD0302          LDA DISTDIFF
AF8D*E9FF            SBC #$FF
AF8F*B005            BCS RIDCOR5D8
AF91*A922            LDA #34
AF93*4CBCB2          JMP PACKDISP

AF96*                RIDCOR5D8
AF96*A923            LDA #35 ;LESS THAN 40 FEET BEHIND
AF98*4CBCB2          JMP PACKDISP

AF9B*                RIDCOR5F ;CALCULATE PACK POSITION
AF9B*A917            LDA #23
AF9D*85A5            STA TIMER4
AF9F*20A5AF          JSR RANDISTCALC
AFA2*4C41AD          JMP RIDCOR5A
```

```
AFA5*              RANDISTCALC
AFA5*AD5D03         LDA RPMDIST+2
AFA8*2907           AND #7

AFAA*0A             ASL A ;*2
AFAB*AA             TAX
AFAC*BD645E         LDA MULTADDR,X
AFAF*8570           STA INDEX4
AFB1*BDE55E         LDA MULTADDR+1,X
AFB4*8571           STA INDEX4+1
AFB6*2033F4         JSR RDYFAC
AFB9*AD1403         LDA RIDLEVEL
AFBC*38             SEC
AFBD*E901           SBC #1 ;MAKE 0-5
AFBF*0A             ASL A ;*16 (FOR 16 GRADES)
AFC0*0A             ASL A
AFC1*0A             ASL A
AFC2*0A             ASL A
AFC3*85E5           STA ASAVE3
AFC5*AD4303         LDA GRADE
AFC8*297F           AND #$7F
AFCA*18             CLC
AFCB*65E5           ADC ASAVE3
AFCD*AA             TAX
AFCE*AD2002         LDA SIGNN
AFD1*C92D           CMP #'-' ;NEGATIVE?
AFD3*F018           BEQ RIDCOR5G2

AFD5*              RIDCOR5G
AFD5*BDE25B         LDA BASEDISTP,X

AFD8*              RIDCOR5G1
AFD8*85DA           STA FACLO
AFDA*209965         JSR NORMAL
AFDD*A570           LDA INDEX4
AFDF*A471           LDY INDEX4+1
AFE1*206966         JSR FMULT
AFE4*20F868         JSR QINT
AFE7*A5DA           LDA FACLO
AFE9*8D0602         STA RANDIST
AFEC*60             RTS

AFED*              RIDCOR5G2 ;NEGATIVE SLOPE
AFED*BD725C         LDA BASEDISTN,X
AFF0*80E6           BRA RIDCOR5G1

AFF2*              RIDCOR5H
AFF2*A906           LDA #6
AFF4*85A7           STA TIMER6

AFF6*20078A         JSR SPEEDDIV10
AFF9*20BD89         JSR WINDCALC
AFFC*206E89         JSR POWERCALC
AFFF*20198A         JSR DACCALC

B002*4C41AD         JMP RIDCOR5A

B005*              RIDCOR6 ;EXPAND
B005*2065EE         JSR BEEP
B008*2003C4         JSR MENU1
B00B*2065E3         JSR PRTLEVEL
B00E*A9FF           LDA #$FF
B010*8D05B3         STA EXPFLG

B013*AD0402         LDA STAFTFLG
B016*F003           BEQ **5 ;NEW ENTRY
B018*4C56B0         JMP RIDCOR6A0
B01B*78             SEI
B01C*2089D6         JSR RESVAL
B01F*20C3BE         JSR UPDATE
```

```
B022*58             CLI ;^
B023*640E           STZ PNT7 ;ARTIFICIALLY LOAD PNT7 IN MIDDLE OF SCREEN FOR ELIPSE
B025*A920           LDA #$20 ;30
B027*850F           STA PNT7+1
B029*20A3A5         JSR DSPCRS
B02C*648E           STZ DIST
B02E*6499           STZ DIST5
B030*58             CLI
B031*202EB3         JSR RIDCURS
B034*A9FF           LDA #$FF
B036*8D0A02         STA STARTFLG
B039*6473           STZ DGCNT1
B03B*9CDF03         STZ DGCNTFLG
B03E*649E           STZ DISTLAST
B040*AD9B02         LDA GRDHEX ;GET 1ST GRADE
B043*8D4203         STA GRADE
B046*2019BA         JSR HEXASCSHRT
B049*A569           LDA ASCI+6
B04B*8D0603         STA GRDASC+1
B04E*A56A           LDA ASCI+7
B050*8D0703         STA GRDASC+2
B053*4C5EB0         JMP RIDCOR6A1

B056*               RIDCOR6A0
B056*20D8B0         JSR EXPCALC
B059*A9FF           LDA #$FF
B05B*8D0A02         STA STARTFLG

B05E*               RIDCOR6A1
B05E*2C4403         BIT TIMTRLFLG ;TIME TRIAL?
B061*3006           BMI *+8 ;YES
B063*20BEEA         JSR MENU26CLR
B066*2009EA         JSR MENU27

B069*               RIDCOR6AA
B069*2083C5         JSR MENU1HSOFT
                    ;^STZ MMFLG ;FOR SCROLL

B06C*               RIDCOR6A
B06C*645F           STZ KEY
B06E*20D3C2         JSR KEYIN1
B071*F0FB           BEQ *-3
B073*C911           CMP #$11 ;START
B075*D003           BNE *+5
B077*4CC0B1         JMP RIDCOR11
B07A*C913           CMP #$13 ;RESET VALUES
B07C*D003           BNE *+5
B07E*4CB0B0         JMP RIDCOR6AT
B081*C912           CMP #$12 ;PREVIOUS MENU
B083*D003           BNE *+5 ;^TEST
                    ;BNE RIDCOR6A ;INVALID KEY
B085*4C32B1         JMP RIDCOR7

B088*C914           CMP #$14
B08A*D0E0           BNE RIDCOR6A
                    ;^TEST

B08C*2068EE         JSR BEEP
B08F*2CC205         BIT MMFLG ;ANY COURSE LEFT?
B092*1005           BPL RIDCOR6AZ ;YES
B094*9CC205         STZ MMFLG ;RESET TO 0
B097*8017           BRA RIDCOR6AT ;RESET AND RTN

B099*               RIDCOR6AZ
B099*2003C4         JSR MENU1
B09C*2083C5         JSR MENU1HSOFT
B09F*20B5A5         JSR DSPCRS01
                    ;BCS RIDCOR6AX ;NOT DONE YET
                    ;LDA #$FF ;FINISHED
                    ;STA MMFLG

B0A2*               RIDCOR6AX
B0A2*206BC3         JSR PRTLEVEL
                    ;JSR TEST
```

```
B0A5*2C4403        BIT TIMTRLFLG ;TIME TRIAL?
B0A8*3003          BMI *+5 ;YES
B0AA*2009EA        JSR MENU27
B0AD*4C6CB0        JMP RIDCOR6A

B0B0*              RIDCOR6A ;RESET VALUES
B0B0*2088D6        JSR RESVAL
B0B3*4C05B0        JMP RIDCOR6

B0B6*              RIDCOR6B ;EXPAND WHILE RUNNING
B0B6*2068BE        JSR BEEP
B0B9*2003C4        JSR MENU1
B0BC*2028C5        JSR MENU1BSOFT
B0BF*206BC3        JSR PRTLEVEL
B0C2*A9FF          LDA #$FF
B0C4*8D0B02        STA EXPFLG
B0C7*20D8B0        JSR EXPCALC
B0CA*2C4403        BIT TIMTRLFLG ;TIME TRIAL?
B0CD*3006          BMI *+8 ;YES
B0CF*20BEEA        JSR MENU28CLR

B0D2*20FFEA        JSR MENU28
B0D5*4C06AD        JMP RIDCOR5AA

B0D8*              EXPCALC
B0D8*2093F4        JSR RDYFAC
B0DB*A58E          LDA DIST
B0DD*85DA          STA FACLO
B0DF*2099E5        JSR NORMAL
B0E2*2043E7        JSR MUL10
B0E5*A21E          LDX #LOW DIST6
B0E7*A004          LDY #HIGH DIST6
B0E9*203166        JSR MOVMF
B0EC*A200          LDX #0
B0EE*9C2202        STZ DSTTOT

B0F1*              EXPCALCB
B0F1*18            CLC
B0F2*BDE902        LDA DSTHEX,X
B0F5*6D2202        ADC DSTTOT
B0F8*8D2202        STA DSTTOT
B0FB*E473          CPX DGCNT1
B0FD*F003          BEQ EXPCALCC
B0FF*E8            INX
B100*D0EF          BNE EXPCALCB ;ALWAYS

B102*              EXPCALCC
B102*869F          STX BYTDIST
B104*38            SEC
B105*AD2202        LDA DSTTOT
B108*E58E          SBC DIST
B10A*8593          STA DIST3
B10C*A204          LDX #4

B10E*              EXPCALCD
B10E*B599          LDA DIST5,X
B110*9594          STA DIST4,X
B112*CA            DEX
B113*10F9          BPL EXPCALCD

B115*A58E          LDA DIST
B117*48            PHA
B118*20B5A5        JSR DSPCRS01
B11B*68            PLA
B11C*858E          STA DIST
B11E*9C1502        STZ LAPNR
B121*6488          STZ NRBYT
B123*640E          STZ PNT7 ;ARTIFICIALLY LOAD PNT7 IN MIDDLE OF SCREEN FOR BLKCURS
B125*A930          LDA #$30
B127*850F          STA PNT7+1
```

```
B129*A673        LDX DGCNT1
B12B*BD0004      LDA SEGADDR+1,X

B12E*2087B3      JSR RIDCURS0
B131*60          RTS

B132*            RIDCOR7 ;COMPRESS DISPLAY
B132*20688E      JSR BEEP
B135*9C0B02      STZ EXPFLG ;CLR 'EXPAND' FLAG
B138*A58E        LDA DIST ;SAVE DIST
B13A*48          PHA
B13B*2003C4      JSR MENU1
B13E*20A3A5      JSR DSPCRS
B141*2065D3      JSR PRTLEVEL
B144*200BC7      JSR MENU2SOFT
B147*68          PLA
B148*858E        STA DIST
B14A*2058B1      JSR NORMCALC

B14D*2C4403      BIT TIMTRLFLG ;TIME TRIAL?
B150*3003        BMI *+5 ;YES
B152*2009EA      JSR MENU27
B155*4C76AC      JMP RIDCOR4 ;FOR NOW

B158*            NORMCALC
B158*9C2202      STZ DSTTOT
B15B*6488        STZ NRBYT
B15D*A200        LDX #0

B15F*            NORMCALCA
B15F*E473        CPX DGCNT1
B161*F00D        BEQ NORMCALCB
B163*18          CLC
B164*BDB902      LDA DSTHEX,X
B167*6D2202      ADC DSTTOT
B16A*8D2202      STA DSTTOT
B16D*E8          INX
B16E*D0EF        BNE NORMCALCA ;ALWAYS

B170*            NORMCALCB
B170*A673        LDX DGCNT1
B172*F005        BEQ NORMCALCC ;0, SKIP REST
B174*BDFF03      LDA SEGADDR,X
B177*8588        STA NRBYT

B179*            NORMCALCC
B179*20F5B3      JSR RIDCURSB
B17C*60          RTS

B17D*            RIDCOR8 ;STOP
B17D*20B4C3      JSR STOPVAL ;PUT SOME VALUES TO 0
B180*EE0A02      INC STARTFLG ;PUT BACK TO $01
B183*20688E      JSR BEEP
B186*2C0B02      BIT EXPFLG
B189*100E        BPL RIDCOR8A
B18B*2C4403      BIT TIMTRLFLG
B18E*3006        BMI *+8
B190*20BEEA      JSR MENU28CLR
B193*2009EA      JSR MENU27
B196*4C69B0      JMP RIDCOR6AA

B199*            RIDCOR8A
B199*2C4403      BIT TIMTRLFLG
B19C*3006        BMI *+8
B19E*20BEEA      JSR MENU28CLR
B1A1*2009EA      JSR MENU27
B1A4*200BC7      JSR MENU2SOFT
B1A7*4C76AC      JMP RIDCOR4

B1AA*            RIDCOR9 ;BACK TO PREVIOUS MENU
B1AA*A953        LDA #$53 ;T1, CA1, CA2, CB1 IRQ OFF
B1AC*8D8E7F      STA $7F8E
```

```
B1AF*2096C0      JSR CHRLD
B1B2*4CEF86      JMP RUN

B1B5*            RIDCOR10
B1B5*A953        LDA #$53  ;CA1, CA2, CB: IRQ OFF
B1B7*8D8E7F      STA $7F8E
B1BA*2083C5      JSR MENU1HSOFT
B1BD*4C6CB0      JMP RIDCOR6A

B1C0*            RIDCOR11
B1C0*209FA8      JSR IRQENABLE
B1C3*AD0A02      LDA STARTFLG ;PREVIOUSLY RUNNING?
B1C6*F019        BEQ RIDCOR11A ;NO
B1C8*A9FF        LDA #$FF
B1CA*8D0A02      STA STARTFLG ;INDICATE NOW RUNNING
B1CD*206BBE      JSR BEEP
B1D0*2028C5      JSR MENU1BSOFT
B1D3*2C4403      BIT TIMTRLFLG
B1D6*3006        BMI *+8
B1D8*20BEEA      JSR MENU28CLR
B1DB*207FEA      JSR MENU28
B1DE*4C06AD      JMP RIDCOR5AA

B1E1*            RIDCOR11A
B1E1*A9FF        LDA #$FF
B1E3*8D0A02      STA STARTFLG
B1E6*4C6CB0      JMP RIDCOR6B

B1E9*            RIDCOR12 ;BACK TO NORMAL DISPLAY
B1E9*206BBE      JSR BEEP
B1EC*9C0B02      STZ EXPFLG ;CLEAR EXPAND FLAG
B1EF*2003C4      JSR MENU1
B1F2*2004C5      JSR MENU1ASOFT
B1F5*206BC3      JSR PRTLEVEL
B1F8*A58E        LDA DIST ;SAVE DIST
B1FA*48          PHA
B1FB*20A3A5      JSR DSPCRS
B1FE*68          PLA
B1FF*858E        STA DIST
B201*2058B1      JSR NORMCALC
B204*2C4403      BIT TIMTRLFLG ;TIME TRIAL?
B207*3003        BMI *+5 ;YES
B209*207FEA      JSR MENU28
B20C*4CFBAC      JMP RIDCOR5BB

B20F*            RIDCOR14 ;STOP AT END OF COURSE
B20F*206BBE      JSR BEEP
B212*20B4C9      JSR STOPVAL ;PUT SOME VALUES TO 0
B215*20C3EE      JSR UPDATE
B218*2045C5      JSR MENU1CSOFT ;ERASE SOFTKEYS
B21B*2C0B02      BIT EXPFLG ;EXPAND?
B21E*1006        BPL RIDCOR14B ;NO
B220*2083C5      JSR MENU1HSOFT
B223*4C29B2      JMP RIDCOR14C

B226*            RIDCOR14B
B226*200BC7      JSR MENU2SOFT

B229*            RIDCOR14C
B229*2C4403      BIT TIMTRLFLG
B22C*3006        BMI *+8
B22E*20BEEA      JSR MENU28CLR ;CLR MENU28
B231*2009EA      JSR MENU27

B234*            RIDCOR14D
B234*645F        STZ KEY
B236*20D3C2      JSR KEYIN1
B239*F0FB        BEQ *-3
B23B*C911        CMP #$11 ;START
B23D*D003        BNE *+5
B23F*4CA6B2      JMP RIDCOR15
B242*2C0B02      BIT EXPFLG ;EXPAND?
```

```
B245*3027         BMI RIDCOR14F ;YES
B247*C912         CMP #$12 ;EXPAND SCREEN
B249*D003         BNE *+5
B24B*4C05B0       JMP RIDCOR6
B24E*C913         CMP #$13 ;RESET VALUES
B250*F007         BEQ RIDCOR14E
B252*C914         CMP #$14 ;PREVIOUS MENU
B254*D0DE         BNE RIDCOR14D
B256*4CAAB1       JMP RIDCOR9

B259*             RIDCOR14E ;RESET VALUES
B259*2068BE       JSR BEEP
B25C*9C0A02       STZ STARTFLG
B25F*205BB5       JSR BLKCURS
B262*2088D6       JSR RESVAL
B265*20C3BE       JSR UPDATE
B268*202EB3       JSR RIDCURS
B26B*4C34B2       JMP RIDCOR14D

B26E*             RIDCOR14F
B26E*C913         CMP #$13 ;RESET VALUES
B270*D003         BNE *+5
B272*4C7FB2       JMP RIDCOR14G
B275*C912         CMP #$12 ;PREVIOUS MENU
B277*D0BB         BNE RIDCOR14D ;INVALID KEY
B279*2068BE       JSR BEEP
B27C*4C53AC       JMP RIDCOR3

B27F*             RIDCOR14G
B27F*2068BE       JSR BEEP
B282*2088D6       JSR RESVAL
B285*9C0A02       STZ STARTFLG
B288*2003C4       JSR MENU1
B28B*20A3A5       JSR DSPCRS
B28E*206BC3       JSR PRTLEVEL
B291*649E         STZ DIST
B293*6499         STZ DIST5
B295*202EB3       JSR RIDCURS
B298*2083C5       JSR MENU1HSOFT
B29B*2C4403       BIT TIMTRLFLG
B29E*3003         BMI *+5
B2A0*2009EA       JSR MENU27
B2A3*4C34B2       JMP RIDCOR14D

B2A6*             RIDCOR15 ;START AFTER COURSE ENDED
                  ;JSR BEEP
B2A6*9C0A02       STZ STARTFLG
B2A9*2088D6       JSR RESVAL
B2AC*2C0B02       BIT EXPFLG ;EXPAND?
B2AF*3003         BMI *+5 ;YES
B2B1*4CA4AC       JMP RIDCOR5
B2B4*4CC8B1       JMP RIDCOR11

B2B7*             PACKDISP0 ;FULL WINDLOAD
B2B7*9C6905       STZ WINDLOADFLG
B2BA*8005         BRA PACKDISP00

B2BC*             PACKDISP ;DISPLAY IN PACK POSITION
B2BC*A2FF         LDX #$FF
B2BE*8E6905       STX WINDLOADFLG

B2C1*             PACKDISP00
B2C1*48           PHA ;SAVE POSITION
B2C2*A510         LDA PNT8
B2C4*8500         STA ADDR
B2C6*A511         LDA PNT8+1
B2C8*8501         STA ADDR+1
B2CA*A205         LDX #5
B2CC*A000         LDY #0

B2CE*             PACKDISP1
B2CE*A900         LDA #0 ;CLEAR EXISTING PACK
```

```
B2D0*9100        STA (ADDR),Y
B2D2*CA          DEX
B2D3*F005        BEQ PACKDISP2
B2D5*207FA7      JSR ADD40
B2D8*80F4        BRA PACKDISP1

B2DA*            PACKDISP2
B2DA*68          PLA ;GET POSITION BACK
B2DB*8500        STA ADDR
B2DD*8510        STA PNT8
B2DF*A920        LDA #$20
B2E1*8501        STA ADDR+1
B2E3*A205        LDX #5
B2E5*A000        LDY #0

B2E7*            PACKDISP3
B2E7*A9FF        LDA #$FF
B2E9*9100        STA (ADDR),Y
B2EB*CA          DEX
B2EC*F005        BEQ PACKDISP4
B2EE*207FA7      JSR ADD40
B2F1*80F4        BRA PACKDISP3

B2F3*            PACKDISP4
B2F3*4C41AD      JMP RIDCOR54
```

Appendix
C

```
                 ;COPYRIGHT 1986 FRONTLINE TECHNOLOGY, INC.
92B0*            AUTWRK
92B0*2088D6      JSR RESVAL ;RESET ALL VALUES

92B3*            AUTWRK0
92B3*2068BE      JSR BEEP
92B6*203197      JSR LIMITCALC ;CALCULATE UPPER AND LOWER LIMITS
92B9*20DAEA      JSR MENU30 ;AUTO TARGET MENU
92BC*20E3A3      JSR DSPONG ;DISPLAY ON

92BF*            AUTWRK1
92BF*207CA5      JSR KEYIN ;READ KEYBOARD
92C2*2068BE      JSR BEEP
92C5*C911        CMP #$11 ;START
92C7*D003        BNE *+5
92C9*4C1D95      JMP AUTOSTART
92CC*C912        CMP #$12 ;CHANGE LIMITS
92CE*D003        BNE *+5
92D0*4CE792      JMP AUTWRK2
92D3*C913        CMP #$13 ;CHANGE MAX
92D5*D003        BNE *+5
92D7*4C8D94      JMP AUTWRK3
92DA*C914        CMP #$14
92DC*D0E1        BNE AUTWRK1
92DE*9CD17F      STZ $7FD1
92E1*2096C0      JSR CHRLD
92E4*4C7587      JMP EXMODE ;PREVIOUS MENU

92E7*            AUTWRK2 ;CHANGE LIMITS
92E7*202FF2      JSR MENU31 ;DISPLAY
92EA*2086F3      JSR MENU32

92ED*            AUTWRK2A
92ED*207CA5      JSR KEYIN ;READ KB
92F0*2068BE      JSR BEEP
92F3*C911        CMP #$11 ;UPPER LIMIT
92F5*F00D        BEQ AUTWRK2B
92F7*C912        CMP #$12 ;LOWER LIMIT
92F9*D003        BNE *+5
92FB*4CD493      JMP AUTWRK2J
92FE*C913        CMP #$13 ;PREVIOUS MENU
9300*D0EB        BNE AUTWRK2A
9302*80AF        BRA AUTWRK0
```

```
9304*              AUTWRK2B ;UPPER LIMIT
9304*A9FF          LDA #$FF
9306*8D1F02        STA DPFLG ;DP NOT ALLOWED

9309*              AUTWRK2B1
9309*A900          LDA #0 ;CLR BLOCK
930B*8DA224        STA $24A2
930E*8DA324        STA $24A3
9311*8DA424        STA $24A4
9314*8DD824        STA $24D8 ;BLINK OFF

9317*8DA924        STA $24A9
931A*A901          LDA #1 ;BLOCK
931C*8DA223        STA $23A2
931F*8DA323        STA $23A3
9322*8DA423        STA $23A4
9325*A902          LDA #2 ;BLINK THESE
9327*8DD923        STA $23D9
932A*A9A0          LDA #$A0
932C*8DD823        STA $23D8

932F*              AUTWRK2C
932F*207CA5        JSR KEYIN
9332*20C8BE        JSR BEEP
9335*C911          CMP #$11 ;UPPER LIMIT (AGAIN)
9337*F0D0          BEQ AUTWRK2B1
9339*C912          CMP #$12 ;LOWER LIMIT
933B*D003          BNE *+5
933D*4CD493        JMP AUTWRK2J
9340*C913          CMP #$13 ;PREVIOUS MENU
9342*D003          BNE *+5
9344*4CB392        JMP AUTWRK0 ;DOES LIMITCALC
9347*C905          CMP #5 ;-
9349*F04D          BEQ AUTWRK2D
934B*C909          CMP #9 ;+
934D*F062          BEQ AUTWRK2G
934F*C93A          CMP #$3A
9351*B0DC          BCS AUTWRK2C ;>9
9353*C930          CMP #$30
9355*90D8          BCC AUTWRK2C ;<0
9357*48            PHA
9358*A980          LDA #$80
935A*8500          STA ADDR
935C*A923          LDA #$23
935E*8501          STA ADDR+1
9360*A203          LDX #3
9362*867A          STX XSAVE
9364*A022          LDY #34
9366*847E          STY YSAVE
9368*A200          LDX #0
936A*68            PLA
936B*2065A4        JSR INDT01+3
936E*B094          BCS AUTWRK2B ;INVALID KEY
9370*20A0BA        JSR ASCHEX
9373*AE2702        LDX USERID
9376*18            CLC
9377*BD1005        LDA LOWLIM,X
937A*6905          ADC #5
937C*C56C          CMP HEX+1
937E*B084          BCS AUTWRK2B ;BELOW OR = LOW LIMIT+5
9380*18            CLC
9381*A56C          LDA HEX+1
9383*6905          ADC #5
9385*DD3A05        CMP HRTMAX,X
9388*9003          BCC *+5
938A*4CB493        JMP AUTWRK2B ;ABOVE OR = MAX-5

938D*A56C          LDA HEX+1
938F*9D2505        STA HIGHLIM,X
9392*206197        JSR LIMITCALC
9395*4CE792        JMP AUTWRK2
```

```
9398*              AUTWRK2D ;-
9398*AE2702        LDX USERID
939B*18            CLC
939C*BD1005        LDA LOWLIM,X
939F*6905          ADC #5
93A1*DD2505        CMP HIGHLIM,X
93A4*B089          BCS AUTWRK2C ;AT OR BELOW LOW LIMIT+5
93A6*BD2505        LDA HIGHLIM,X
93A9*38            SEC
93AA*E901          SBC #1
93AC*9D2505        STA HIGHLIM,X
93AF*801A          BRA AUTWRK2G1

93B1*              AUTWRK2G ;+
93B1*AE2702        LDX USERID
93B4*18            CLC
93B5*BD2505        LDA HIGHLIM,X
93B8*6905          ADC #5
93BA*DD3A05        CMP HRTMAX,X
93BD*9003          BCC *+5
93BF*4C2F93        JMP AUTWRK2C ;ALREADY AT MAX
93C2*18            CLC
93C3*BD2505        LDA HIGHLIM,X
93C6*6901          ADC #1
93C8*9D2505        STA HIGHLIM,X

93CB*              AUTWRK2G1
93CB*203197        JSR LIMITCALC
93CE*2039F3        JSR MENU31A
93D1*4C0993        JMP AUTWRK2B1

93D4*              AUTWRK2J ;LOWER LIMIT
93D4*A900          LDA #0
93D6*8DA223        STA $23A2 ;CLR BLOCK
93D9*8DA323        STA $23A3
93DC*8DA423        STA $23A4
93DF*8DD823        STA $23D8 ;CLR BLINK
93E2*8DD923        STA $23D9
93E5*A901          LDA #1
93E7*8DA224        STA $24A2 ;BLOCK
93EA*8DA324        STA $24A3
93ED*8DA424        STA $24A4
93F0*A9A0          LDA #$A0
93F2*8DD824        STA $24D8
93F5*A902          LDA #2
93F7*8DD924        STA $24D9
93FA*A9FF          LDA #$FF
93FC*8D1F02        STA DPFLG ;NO DP

93FF*              AUTWRK2K
93FF*207CA5        JSR KEYIN
9402*2068EE        JSR BEEP
9405*C911          CMP #$11 ;UPPER LIMIT
9407*D003          BNE *+5
9409*4C0493        JMP AUTWRK2B
940C*C912          CMP #$12 ;LOWER LIMIT (AGAIN)
940E*F0EF          BEQ AUTWRK2K
9410*C913          CMP #$13 ;PREVIOUS MENU
9412*D003          BNE *+5
9414*4CB392        JMP AUTWRK0

9417*C905          CMP #5 ;-
9419*F042          BEQ AUTWRK2M
941B*C909          CMP #9 ;+
941D*F04E          BEQ AUTWRK2N
941F*C93A          CMP #$3A
9421*B0DC          BCS AUTWRK2K ;>9
9423*C930          CMP #$30
9425*90D8          BCC AUTWRK2K ;<0
9427*48            PHA
9428*A980          LDA #$80
942A*8500          STA ADDR
942C*A924          LDA #$24
```

```
942E*8501      STA ADDR+1
9430*A203      LDX #3
9432*867A      STX XSAVE
9434*A022      LDY #34
9436*847E      STY YSAVE
9438*A200      LDX #0
943A*68        PLA
943B*2065A4    JSR INDT01+3
943E*B054      BCS AUTWRK2J ;INVALID KEY
9440*20A0BA    JSR ASCHEX
9443*AE2702    LDX USERID
9446*A56C      LDA HEX+1
9448*F08A      BEQ AUTWRK2J ;0
944A*18        CLC
944B*6905      ADC #5
944D*DD2505    CMP HIGHLIM,X
9450*B082      BCS AUTWRK2J ;AT OR ABOVE HIGH LIMIT-5
9452*A56C      LDA HEX+1
9454*9D1005    STA LOWLIM,X
9457*203197    JSR LIMITCALC
945A*4CE792    JMP AUTWRK2

945D*          AUTWRK2M ;-
945D*AE2702    LDX USERID
9460*BD1005    LDA LOWLIM,X
9463*F09A      BEQ AUTWRK2K ;ALREADY 0
9465*38        SEC
9466*E901      SBC #1
9468*9D1005    STA LOWLIM,X
946B*8017      BRA AUTWRK2N1

946D*          AUTWRK2N ;+
946D*AE2702    LDX USERID
9470*18        CLC
9471*BD1005    LDA LOWLIM,X
9474*6905      ADC #5
9476*DD2505    CMP HIGHLIM,X
9479*B084      BCS AUTWRK2K ;ALREADY AT HIGH LIMIT-5
947B*18        CLC
947C*BD1005    LDA LOWLIM,X
947F*6901      ADC #1
9481*9D1005    STA LOWLIM,X

9484*          AUTWRK2N1
9484*203197    JSR LIMITCALC
9487*2039F3    JSR MENU31A
948A*4CD493    JMP AUTWRK2J

948D*          AUTWRK3
948D*209EF3    JSR MENU33

9490*          AUTWRK3A
9490*A901      LDA #1
9492*8D9823    STA $2398 ;BLOCK
9495*8D9923    STA $2399
9498*8D9A23    STA $239A
949B*A92A      LDA #$2A
949D*8DD623    STA $23D6
94A0*A9FF      LDA #$FF
94A2*8D1F82    STA DPFLG ;NO DP

94A5*          AUTWRK3B
94A5*207CA5    JSR KEYIN
94A8*2068BE    JSR BEEP
94AB*C911      CMP #$11 ;PREVIOUS MENU
94AD*D003      BNE *+5
94AF*4CB392    JMP AUTWRK0

94B2*C905      CMP #5 ;-
94B4*F03A      BEQ AUTWRK3C
94B6*C909      CMP #9 ;+
```

```
94B8*F047          BEQ AUTWRK3D
94BA*C93A          CMP #$3A
94BC*B0E7          BCS AUTWRK3B ;>9
94BE*C930          CMP #$30
94C0*90E3          BCC AUTWRK3B ;<0
94C2*48            PHA
94C3*A980          LDA #$80
94C5*8500          STA ADDR
94C7*A923          LDA #$23
94C9*8501          STA ADDR+1
94CB*A203          LDX #3
94CD*867A          STX XSAVE
94CF*A018          LDY #24
94D1*847E          STY YSAVE
94D3*A200          LDX #0

94D5*68            PLA
94D6*20E544        JSR INDT01+3
94D9*B0E5          BCS AUTWRK3A ;INVALID KEY
94DB*2040BA        JSR ASCHEX
94DE*AE2702        LDX USERID
94E1*A56C          LDA HEX+1
94E3*C9DC          CMP #221
94E5*B0A9          BCS AUTWRK3A ;>220
94E7*9D3A05        STA HRTMAX,X
94EA*208D86        JSR UPLOWCALC ;CALCULATE NEW LIMITS
94ED*4CB392        JMP AUTWRK6

94F0*              AUTWRK3C :-
94F0*AE2702        LDX USERID
94F3*BD3A05        LDA HRTMAX,X
94F6*38            SEC
94F7*E901          SBC #1
94F9*9D3A05        STA HRTMAX,X
94FC*208D86        JSR UPLOWCALC ;CALCULATE NEW LIMITS
94FF*8013          BRA AUTWRK3D1

9501*              AUTWRK3D ;+
9501*AE2702        LDX USERID
9504*BD3A05        LDA HRTMAX,X
9507*C9DC          CMP #220
9509*B09A          BCS AUTWRK3B ;ALREADY AT 220
950B*18            CLC
950C*6901          ADC #1
950E*9D3A05        STA HRTMAX,X
9511*208D86        JSR UPLOWCALC ;CALCULATE NEW LIMITS

9514*              AUTWRK3D1
9514*203197        JSR LIMITCALC
9517*20EDF3        JSR MENU33A
951A*4C9894        JMP AUTWRK3A

951D*              AUTOSTART ;START AUTO TARGET
951D*20BAED        JSR MENU30ASOFT ;SOFT KEYS
9520*20728D        JSR LDINITDAC ;INITIALIZE A/D, LOAD VALUES IN FLOATING POINT
9523*209FA8        JSR IRQENABLE
9526*9C6F05        STZ INCFLG
9529*9C6E05        STZ DECFLG
952C*9C7005        STZ FACEFLG
952F*A909          LDA #9 ;10 READINGS
9531*8D4903        STA HRTCNT
9534*2057F0        JSR WARMUP ;"WARM-UP"

9537*              AUTOS1
9537*645F          STZ KEY

9539*              AUTOS2
9539*2062B7        JSR RPMCALC ;CALCULATE SPEED
```

```
9530*2001E7      JSR CADCALC ;CALCULATE CADENCE
953F*2040E9      JSR HEARTCALC ;CALCULATE HEART RATE
9542*202B30      JSR ADAVG ;RUNNING TOTAL OF 10 A/D READINGS
9545*A5A3        LDA TIMER2 ;1 SEC?
9547*D003        BNE *+5 ;NO
9549*4CA695      JMP AUTOS5
954C*A5A7        LDA TIMER6 ;0.24 SEC?
954E*D00A        BNE AUTOS2A ;NO
9550*A900        LDA #0 ;RESET
9552*85A7        STA TIMER6
9554*20076A      JSR SPEEDDIV10 ;CALCULATE TRUE SPEED (DIVIDE BY 10)
9557*20198A      JSR DACCALC ;CALCULATE NEW DAC VALUE

955A*            AUTOS2A
955A*A55F        LDA KEY ;KB?
955C*F01A        BEQ AUTOS2B ;NO
955E*C911        CMP #$11 ;STOP
9560*F010        BEQ AUTOS2A1
9562*C912        CMP #$12 ;TURN ON/OFF HEART RATE BEEP
9564*D0D1        BNE AUTOS1
9566*2068BE      JSR BEEP
9569*A202        LDX #2 ;ROW 2
956B*208892      JSR HRBEEPTOGGLEL ;TOGGLE HEART RATE BEEP
956E*645F        STZ KEY
9570*8006        BRA AUTOS2B

9572*            AUTOS2A1
9572*20B4C3      JSR STOPVAL ;PUT SOME VALUES TO 0
9575*4CB392      JMP AUTWRK0 ;^??

9578*            AUTOS2B
9578*AD0A02      LDA STARTFLG
957B*D0BC        BNE AUTOS2 ;PAST WARMUP
957D*AD1E03      LDA ELTIMMIN
9580*C902        CMP #2
9582*90B5        BCC AUTOS2 ;NOT 2 MIN YET
9584*206CF0      JSR CLRFACE ;ERASE "WARM UP"
9587*CE0A02      DEC STARTFLG ;=$FF
958A*A955        LDA #LOW FPRPWR ;GET PRESENT POWER
958C*A004        LDY #HIGH FPRPWR
958E*20DF67      JSR MOVFM
9591*203B67      JSR DIV10 ;DIVIDE BY 10
9594*20E664      JSR FADDH ;ROUND
9597*200569      JSR INT ;TO INTEGER
959A*201F67      JSR MUL10 ;MULTIPLY BY 10
959D*A2CF        LDX #LOW FPPOWER ;STORE IN POWER
959F*A003        LDY #HIGH FPPOWER
95A1*20DD68      JSR MOVMF
95A4*8093        BRA AUTOS2

95A6*            AUTOS5 ;1 SEC
95A6*A919        LDA #25 ;RESET
95A8*85A3        STA TIMER2
95AA*208BF0      JSR UPMEN30 ;UPDATE ALL NUMBERS
95AD*AD0A02      LDA STARTFLG ;RUNNING?

95B0*D003        BNE AUTOS6 ;YES
95B2*4C3995      JMP AUTOS2

95B5*            AUTOS6
95B5*A9AC        LDA #LOW FPHRTAVG ;GET AVG HEART RATE
95B7*A004        LDY #HIGH FPHRTAVG
95B9*20DF67      JSR MOVFM
95BC*A9B1        LDA #LOW FPLOWTEST ;COMPARE WITH LOW LIMIT
95BE*A004        LDY #HIGH FPLOWTEST
95C0*207468      JSR FCOMP ;UNDER LOW LIMIT?
95C3*3003        BMI AUTOS7 ;YES
95C5*4C6F96      JMP AUTOS9 ;CHECK IF ABOVE HIGH

95C8*            AUTOS7
95C8*AD7005      LDA FACEFLG ;FACE ON?
95CB*D005        BNE AUTOS7A ;YES
95CD*AD6E05      LDA DECFLG ;DECREASE ARROW?
95D0*F009        BEQ AUTOS7B ;NO
```

```
95D2*                   AUTOS7A
95D2*206CF0             JSR CLRFACE  ;CLEAR FACE
95D5*9C7005             STZ FACEFLG
95D8*9C6E05             STZ DECFLG

95DB*                   AUTOS7B
95DB*AD6F05             LDA INCFLG  ;INCREASED LAST TIME?
95DE*F00A               BEQ AUTOS8  ;NO
95E0*AD2C03             LDA SPTIMSEC
95E3*C928               CMP #40  ;40 SEC YET?
95E5*B003               BCS *+5  ;YES
95E7*4C3995             JMP AUTOS2

95EA*                   AUTOS8
95EA*9C2C03             STZ SPTIMSEC  ;RESET TIMER
95ED*9C2D03             STZ SPTIMTNTH

95F0*A9FF               LDA #$FF
95F2*8D6F05             STA INCFLG
95F5*9C6E05             STZ DECFLG
95F8*9C7005             STZ FACEFLG
95FB*AD2903             LDA SPDHEX
95FE*D00A               BNE AUTOS8AA
9600*AD2A03             LDA SPDHEX+1
9603*C950               CMP #80  ;< 8 MPH?
9605*B003               BCS AUTOS8AA  ;NO
9607*4CDD96             JMP AUTOS11AA  ;DECREASE LOAD

960A*                   AUTOS8AA
960A*A9FF               LDA #$FF
960C*CD0C02             CMP DACTMP  ;DAC FULL?
960F*F010               BEQ AUTOS8A  ;YES
9611*A9CF               LDA #LOW FPPOWER  ;POWER < 1000?
9613*A003               LDY #HIGH FPPOWER
9615*20DF67             JSR MOVFM
9618*A91E               LDA #LOW INT1000

961A*A064               LDY #HIGH INT1000
961C*209468             JSR FCOMP
961F*3006               BMI AUTOS8B  ;YES

9621*                   AUTOS8A
9621*201FEF             JSR INCREASEFFORT

9624*4C3995             JMP AUTOS2

9627*                   AUTOS8B
9627*A9AC               LDA #LOW FPHRTAVG
9629*A004               LDY #HIGH FPHRTAVG
962B*20DF67             JSR MOVFM
962E*A9B1               LDA #LOW FPLOWTEST
9630*A004               LDY #HIGH FPLOWTEST
9632*20ED64             JSR FSUB  ;GET DIFFERENCE IN HEART RATE
9635*203E67             JSR DIV10  ;DIVIDE BY 10
9638*20E664             JSR FADDH  ;ROUND
963B*200569             JSR INT  ;TO INTEGER
963E*A263               LDX #LOW FACTMP  ;SAVE
9640*A003               LDY #HIGH FACTMP
9642*200D68             JSR MOVMF
9645*A956               LDA #LOW INT1  ;<1?
9647*A063               LDY #HIGH INT1
9649*209468             JSR FCOMP
964C*1006               BPL AUTOS8C  ;NO
964E*A956               LDA #LOW INT1  ;USE 1
9650*A063               LDY #HIGH INT1
9652*8004               BRA AUTOS8D

9654*                   AUTOS8C
9654*A963               LDA #LOW FACTMP  ;GET BACK
9656*A003               LDY #HIGH FACTMP
```

```
9658*              AUTOS8D
9658*20DF67        JSR MOVFM
965B*201F67        JSR MUL10  ;MULTIPLY BY 10

965E*A9CF          LDA #LOW FPPOWER ;INCREASE THAT AMOUNT
9660*A003          LDY #HIGH FPPOWER
9662*200465        JSR FADD
9665*A2CF          LDX #LOW FPPOWER ;SAVE
9667*A003          LDY #HIGH FPPOWER
9669*200D68        JSR MOVMF
966C*4C3995        JMP AUTOS2

966F*              AUTOS9 ;CHECK FOR ABOVE LIMIT
966F*A9AC          LDA #LOW FPHRTAVG
9671*A004          LDY #HIGH FPHRTAVG
9673*20DF67        JSR MOVFM
9676*A9BB          LDA #LOW FPHIGHTST5 ;> UPPER LIMIT + 5?
9678*A004          LDY #HIGH FPHIGHTST5
967A*209468        JSR FCOMP
967D*C901          CMP #1
967F*D003          BNE *+5

9681*4C2097        JMP AUTOS13 ;YES

9684*A9AC          LDA #LOW FPHRTAVG
9686*A004          LDY #HIGH FPHRTAVG
9688*20DF67        JSR MOVFM
968B*A9B6          LDA #LOW FPHIGHTEST
968D*A004          LDY #HIGH FPHIGHTEST
968F*209468        JSR FCOMP ;OVER LIMIT?
9692*C901          CMP #1
9694*F01C          BEQ AUTOS10 ;YES
9696*AD7005        LDA FACEFLG ;HAPPY FACE ALREADY ON?
9699*D00E          BNE AUTOS9A ;YES
969B*20C9ED        JSR HAPPYFACE
969E*A9FF          LDA #$FF
96A0*8D7005        STA FACEFLG
96A3*8D6F05        STA INCFLG
96A6*8D6E05        STA DECFLG

96A9*              AUTOS9A
96A9*9C2C03        STZ SPTIMSEC ;RESET TIMER
96AC*9C2D03        STZ SPTIMTNTH
96AF*4C3995        JMP AUTOS2

96B2*              AUTOS10
96B2*AD7005        LDA FACEFLG ;FACE ON?
96B5*D005          BNE AUTOS10A ;YES
96B7*AD6E05        LDA DECFLG ;DECREASE ARROW?
96BA*F009          BEQ AUTOS10B ;NO

96BC*              AUTOS10A
96BC*206CF0        JSR CLRFACE
96BF*9C6F05        STZ INCFLG
96C2*9C7005        STZ FACEFLG

96C5*              AUTOS10B
96C5*AD6E05        LDA DECFLG ;JUST DECREASED?
96C8*F00A          BEQ AUTOS11 ;NO
96CA*AD2C03        LDA SPTIMSEC ;20 SEC UP?
96CD*C914          CMP #20
96CF*B003          BCS *+5
96D1*4C3995        JMP AUTOS2 ;NO

96D4*              AUTOS11
96D4*9C6F05        STZ INCFLG
96D7*9C7005        STZ FACEFLG
96DA*CE6E05        DEC DECFLG ;= $FF

96DD*              AUTOS11AA
96DD*9C2D03        STZ SPTIMTNTH ;RESET TIMERS
96E0*9C2C03        STZ SPTIMSEC
```

```
96E3*AD0C02        LDA DACTMP ;DAC AT 0?
96E6*F010          BEQ AUTOS11A ;YES
96E8*A923          LDA #LOW INT0 ;POWER > 0?
96EA*A064          LDY #HIGH INT0
96EC*20DF67        JSR MOVFM

9756*A004          LDY #HIGH FPHIGHLIM
9758*200D68        JSR MOVMF

975B*2033F4        JSR RDYFAC
975E*AE2702        LDX USERID
9761*BD3A05        LDA HPTMAX,X
9764*8504          STA FACLO
9766*2075A5        JSR NORMAL
9769*2045A8        JSR MOVAF
976C*A919          LDA #LOW INT100
976E*A064          LDY #HIGH INT100
9770*20DF67        JSR MOVFM
9773*20E4FD        JSR FPDIV
9776*A2CA          LDX #LOW FPMAX
9778*A004          LDY #HIGH FPMAX
977A*200D68        JSR MOVMF

977D*A9C0          LDA #LOW FPLOWLIM
977F*A004          LDY #HIGH FPLOWLIM
9781*20DF67        JSR MOVFM
9784*A9C5          LDA #LOW FPHIGHLIM
9786*A004          LDY #HIGH FPHIGHLIM
9788*20ED64        JSR FSUB ;HIGH - LOW
978B*A941          LDA #LOW INTPT2
978D*A064          LDY #HIGH INTPT2
978F*206566        JSR FMULT ;* 0.2
9792*A263          LDX #LOW FACTMP ;SAVE
9794*A003          LDY #HIGH FACTMP
9796*200D68        JSR MOVMF

9799*A9C0          LDA #LOW FPLOWLIM
979B*A004          LDY #HIGH FPLOWLIM
979D*200465        JSR FADD ;+ LOW
97A0*A2B1          LDX #LOW FPLOWTEST
97A2*A004          LDY #HIGH FPLOWTEST
97A4*200D68        JSR MOVMF

97A7*A963          LDA #LOW FACTMP
97A9*A003          LDY #HIGH FACTMP
97AB*20DF67        JSR MOVFM
97AE*A9C5          LDA #LOW FPHIGHLIM
97B0*A004          LDY #HIGH FPHIGHLIM
97B2*20ED64        JSR FSUB ;HIGH - 0.2*DIFF
97B5*A2B6          LDX #LOW FPHIGHTEST
97B7*A004          LDY #HIGH FPHIGHTEST
97B9*200D68        JSR MOVMF

97BC*A9C5          LDA #LOW FPHIGHLIM
97BE*A004          LDY #HIGH FPHIGHLIM
97C0*20DF67        JSR MOVFM
97C3*A99C          LDA #LOW INT5
97C5*A063          LDY #HIGH INT5
97C7*200465        JSR FADD
97CA*A2BB          LDX #LOW FPHIGHTST5
97CC*A004          LDY #HIGH FPHIGHTST5

96EF*A9CF          LDA #LOW FPPOWER
96F1*A003          LDY #HIGH FPPOWER
96F3*2094 65       JSR FCOMP
96F6*3010          BMI AUTOS12 ;NO

96F8*                AUTOS11A
96F8*206E05        BIT DECFLG ;DECREASE ALREADY ON?
96FB*3008          BMI AUTOS11C ;YES
```

```
96FD*              AUTOS11B
96FD*20B9EF        JSR DECREASEFFORT
9700*A9FF          LDA #$FF
9702*8D6E05        STA DECFLG

9705*              AUTOS11C
9705*4C3995        JMP AUTOS2

9708*              AUTOS12
                   ;JSR CLRFACE
9708*A9C9          LDA #LOW INT10
970A*A063          LDY #HIGH INT10
970C*20DF67        JSR MOVFM
970F*A9CF          LDA #LOW FPPOWER
9711*A003          LDY #HIGH FPPOWER
9713*20ED64        JSR FSUB ;DECREASE BY 10
9716*A2CF          LDX #LOW FPPOWER
9718*A003          LDY #HIGH FPPOWER
971A*200D68        JSR MOVMF
971D*4C3995        JMP AUTOS2

9720*              AUTOS13
9720*9CA07F        STZ $7FA0 ;0 DAC
9723*9CBC02        STZ DACTMP
9726*9CCF03        STZ FPPOWER
9729*9C7005        STZ FACEFLG
972C*9C6F05        STZ INCFLG
972F*80CC          BRA AUTOS11B

9731*              LIMITCALC ;CALCULATE LIMITS
9731*2033F4        JSR RDYFAC
9734*AE2702        LDX USERID
9737*BD1005        LDA LOWLIM,X
973A*85DA          STA FACLO
973C*207565        JSR NORMAL
973F*A2C0          LDX #LOW FPLOWLIM
9741*A004          LDY #HIGH FPLOWLIM
9743*200D68        JSR MOVMF

9746*2033F4        JSR RDYFAC
9749*AE2702        LDX USERID
974C*BD2505        LDA HIGHLIM,X
974F*85DA          STA FACLO
9751*207565        JSR NORMAL
9754*A2C5          LDX #LOW FPHIGHLIM

97CE*200D68        JSR MOVMF ;UPPER LIMIT + 5

97D1*A9E1          LDA #LOW FPLOWTEST
97D3*A004          LDY #HIGH FPLOWTEST
97D5*20F597        JSR LIMITADDRCALC ;CALCULATE LOW LIMIT ADDRESS
97D8*A500          LDA ADDR ;SAVE ADDRESS
97DA*851A          STA PNT13
97DC*A501          LDA ADDR+1
97DE*851B          STA PNT13+1
97E0*202798        JSR LIMITDSP ;DRAW LINE
97E3*A9E6          LDA #LOW FPHIGHTEST
97E5*A004          LDY #HIGH FPHIGHTEST
97E7*20F597        JSR LIMITADDRCALC
97EA*A500          LDA ADDR ;SAVE ADDRESS OF HIGH LIMIT
97EC*851C          STA PNT14
97EE*A501          LDA ADDR+1
97F0*851D          STA PNT14+1
97F2*4C2798        JMP LIMITDSP ;NOW DRAW LINE AND RTN

97F5*              LIMITADDRCALC
97F5*20C966        JSR CONUPK
97F8*A94B          LDA #LOW INT31
97FA*A064          LDY #HIGH INT31
97FC*20DF67        JSR MOVFM
97FF*20F064        JSR FSUBT
```

```
9802*A946         LDA  #LOW INTPT55
9804*A064         LDY  #HIGH INTPT55
9806*206566       JSR  FMULT
9809*20E664       JSR  FADDH
980C*200569       JSR  INT
980F*A950         LDA  #LOW INT64
9811*A064         LDY  #HIGH INT64
9813*206566       JSR  FMULT
9816*20D468       JSR  QINT
9819*38           SEC
981A*A980         LDA  #$80
981C*E5DA         SBC  FACLO
981E*8500         STA  ADDR
9820*A93F         LDA  #$3F
9822*E5D9         SBC  FACMO
9824*8501         STA  ADDR+1
9826*60           RTS

9827*             LIMITDSP ;DRAW DOUBLE LINE AT ADDRESS
9827*A003         LDY  #3
9829*A90F         LDA  #$0F
982B*9100         STA  (ADDR),Y
982D*C8           INY
982E*A9FF         LDA  #$FF

9830*             LIMITDSP1
9830*9100         STA  (ADDR),Y
9832*C8           INY
9833*C008         CPY  #8
9835*D0F9         BNE  LIMITDSP1

9837*207FA7       JSR  ADD40
983A*A003         LDY  #3
983C*A90F         LDA  #$0F
983E*9100         STA  (ADDR),Y
9840*C8           INY
9841*A9FF         LDA  #$FF

9843*             LIMITDSP2
9843*9100         STA  (ADDR),Y
9845*C8           INY
9846*C008         CPY  #8
9848*D0F9         BNE  LIMITDSP2

984A*60           RTS
```

What is claimed is:

1. In an optical character recognition system in which a text image comprising a plurality of characters is separated into plural individual character images, each of said individual character images comprising an array of original pixels of dimensions $x_{max}$ and $y_{max}$ in respective orthogonal directions, each of said pixels being one of a plurality of pixel values, a character normalization device for normalizing each of said individual character images to a size $X_{max} = Ax_{max}$ and $Y_{max} = By_{max}$ in said respective orthogonal directions in accordance with orthogonal normalization ratios A and B respectively, A and B being any real numbers, comprising:

means for defining a set of normalized image pixel locations, said normalized image pixel locations having a pitch relative to said original pixels in each of said orthogonal directions corresponding to said orthogonal normalization ratios A and B, respectively;

means for computing a value for each one of said normalized pixel locations from the values of the original pixels which lie within an elliptical neighborhood surrounding said one normalized pixel location, whereby to compute a set of normalized pixel location values defining a normalized individual character image.

2. The device of claim 1 wherein said elliptical neighborhood is centered on said one normalized pixel location.

3. The device of claim 2 wherein said elliptical neighborhood is characterized by major and minor axes whose lengths are approximately equal to the lengths spanned in said original image by A and B original pixels, respectively.

4. The device of claim 3 wherein said plurality of pixel values is two such that said image is a binary image, and wherein said means for computing assigns said one normalized pixel location a first value if the value of any of the original pixels lying within the corresponding elliptical neighborhood is said first value and otherwise assigns it a second value.

5. The device of claim 3 wherein the location of said one normalized pixel location in said original image is (X,Y), the location of a given one of said original pixels is (x,y) and said means for computing determines that said given one of said original pixels lies within said elliptical neighborhood if:

$$(X-x)^2/(A/2)^2+(Y-y)^2/(B/2)^2 < R \text{ or } = R,$$

wherein R is a number which determines the amount of overlap between adjacent elliptical neighborhoods.

6. The device of claim 5 wherein R=1.

7. The device of claim 5 wherein, for each one of said elliptical neighborhoods, said given one of said original pixels is selected from a rectangle of pixels centered around said elliptical neighborhood, said rectangle characterized by sides of lengths A and B in said original image.

8. In an optical character recognition system in which a text image comprising a plurality of characters is separated into plural individual character images, each of said individual character images comprising an array of original pixels, each of said pixels characterized by one of a plurality of pixel values, a method for scaling each of said individual character images in accordance with orthogonal scaling ratios A and B comprising:

defining a set of normalized image pixel locations, said normalized image pixel locations having a pitch relative to said original pixels in each of said orthogonal directions corresponding to said orthogonal normalization ratios A and B, respectively;

computing a value for each one of said normalized pixel locations from the values of the original pixels which lie within an elliptical neighborhood surrounding said one normalized pixel location; and transmitting the normalized pixel location values computed by said computing step as a normalized individual character image.

9. The method of claim 8 wherein said elliptical neighborhood is centered on said one normalized pixel location.

10. The method of claim 9 wherein said elliptical neighborhood is characterized by major and minor axes whose lengths are approximately equal to the lengths spanned in said original image by A and B original pixels, respectively.

11. The method of claim 10 wherein said plurality of pixel values is two such that said image is a binary image, and wherein said computing step comprises assigning said one normalized pixel location a first value if the value of any of the original pixels lying within the corresponding elliptical neighborhood is said first value and otherwise assigning it a second value.

12. The method of claim 10 wherein the location of said one normalized pixel location in said original image is (X,Y), the location of a given one of said original pixels is (x,y) and computing step comprises determining that said given one of said original pixels lies within said elliptical neighborhood if:

$$(X-x)^2/(A/2)^2+(Y-y)^2/(B/2)^2 < R \text{ or } = R,$$

wherein R is a number which determines the amount of overlap between adjacent elliptical neighborhoods.

13. The method of claim 12 wherein R=1.

14. The method of claim 12 further comprising selecting said given one of said original pixels from a rectangle of pixels centered around said elliptical neighborhood, said rectangle characterized by sides of lengths A and B in said original image.

15. In a method for character normalization in optical character recognition in which the image of an individual character comprising an array of original pixels is normalized in accordance with horizontal and vertical scaling factors A and B to construct a normalized character image comprising an array of normalized pixels, the improvement comprising the steps of:

defining in said array of original pixels a plurality of elliptical neighborhoods each having a minor axis and a major axis, said minor and major axes having lengths corresponding to said horizontal and vertical scaling factors A and B respectively, said neighborhoods being located at periodic horizontal and vertical intervals in respective horizontal and vertical directions therein, said horizontal and vertical intervals corresponding to said horizontal and vertical scaling factors A and B, respectively; and computing the value of each normalized pixel from a set of said original pixels lying within a corresponding one of said elliptical neighborhoods.

16. The method of claim 15 wherein said original and normalized pixel arrays represent bi-tonal images in which the value of each of said pixels is either "on" or "off", and wherein said computing step sets the value of each normalized pixel to "on" if any of the original pixels in the corresponding one of said elliptical neighborhoods is "on", and otherwise sets said value to "off".

* * * * *

UNITED STATES PATENT AND TRADEMARK OFFICE
CERTIFICATE OF CORRECTION

PATENT NO.   : 4,977,602

DATED        : December 11, 1990

INVENTOR(S)  : L. J. Beato

It is certified that error appears in the above-identified patent and that said Letters Patent is hereby corrected as shown below:

Columns 7 through 83 --entire contents of APPENDIX should be deleted and replaced with the attached pages of the APPENDIX.

Signed and Sealed this

Fourteenth Day of July, 1992

*Attest:*

DOUGLAS B. COMER

*Attesting Officer*   *Acting Commissioner of Patents and Trademarks*

```
/***************************************************************
 *
 *     Procedure: ScaleAndBuildInputData
 *
 *     Author: Louis J. Beato
 *     Date:     09/27/88
 *
 *     Modification History:
 *
 *     Purpose: The purpose of this procedure is to normalize an
 *     input image to any desired size.
 *
 *     Calling Sequence:
 *
 *     Operational Details: Compute the column and row radius of the
 *     ellipse. Determine if any pixels are located on the interior
 *     of the ellipse.
 *
 ***************************************************************/
ScaleAndBuildInputData (StartLine,
              EndLine,
              StartCol,
              EndCol)
int   StartLine, EndLine, StartCol, EndCol;
{
int     Height, Width, I, J;
double    InputI, InputJ;
double    RowRadius, ColRadius;
FILE *fp;
static    char InitFilename[30] = "Dumpdat.";
static    int  Version = 0;
char VersionStr[10];
char Filename[60];
int  Index;
unsigned long Bit;

double    *InputBufPtr;

Index = 0;
        Bit = 1;
        InputBufPtr = InputUnit;
        *InputBufPtr = 0;

Height = EndLine - StartLine + 1;
        Width  = EndCol  - StartCol  + 1;

RowRadius = ((double)Height/(double)HORIZONTAL_RESOLUTION);
```

```c
    ColRadius = ((double)Width/(double)VERTICAL_RESOLUTION);

/* Step thru the 24 x 12 output array */
for (I = 0; I < HORIZONTAL_RESOLUTION; I++)
{
     for (J = 0; J < VERTICAL_RESOLUTION; J++)
     {
          InputI = StartLine + (I * RowRadius);
          InputJ = StartCol  + (J * ColRadius);
          /* Check elliptical area to see if any pixels inside
          */
          if (CheckNeighbors (     InputI,
                         InputJ,
                         RowRadius,
                         ColRadius,
                         StartLine,
                         StartCol,
                         EndLine,
                         EndCol) == TRUE)
          {

*InputBufPtr++ = 1;

}
          else
          {
               *InputBufPtr++ = 0;
          }
     }
  }
}
```

```
/*****************************************************************
*
*      Procedure: CheckNeighbors
*
*      Author: Louis J. Beato
*      Date:      07/25/88
*
*      Modification History:
*
*      Purpose: The purpose of this procedure is to scan the interior
*      of the ellipse looking for pixels.
*
*      Calling Sequence:
*
*      Operational Details:
*
*****************************************************************/

BOOLEAN CheckNeighbors (InputI,
              InputJ,
              RowRadius,
              ColRadius,
              FirstLine,
              FirstColumn,
              LastLine,
              LastColumn)
double    InputI, InputJ, RowRadius, ColRadius;
int  FirstLine, FirstColumn, LastLine, LastColumn;
{
int  I, J, StartRow, StartCol, EndRow, EndCol;
BOOLEAN   Pixel;
int  PixelCount;

/* Add 0.5 to allow round up */
     StartRow = (int)(InputI - RowRadius/2 + 0.5);
     if (StartRow < FirstLine)
          StartRow = FirstLine;

StartCol = (int)(InputJ - ColRadius/2 + 0.5);
     if (StartCol < FirstColumn)
          StartCol = FirstColumn;

EndRow   = (int)(InputI + RowRadius/2);
     if (EndRow > LastLine)
          EndRow = LastLine;
```

```
EndCol   = (int)(InputJ + ColRadius/2);
if (EndCol > LastColumn)
      EndCol = LastColumn;

Pixel = FALSE;
I = StartRow;
do
{
      J = StartCol;
      do
      {
            if (LineBufPtr[I][J] != 0)
                  Pixel = TRUE;
            J++;
      } while ((Pixel == FALSE) && (J <= EndCol));

I++;
} while ((Pixel == FALSE) && (I <= EndRow));

return (Pixel);
```